United States Patent
Suzuki et al.

(10) Patent No.: US 8,047,662 B2
(45) Date of Patent: Nov. 1, 2011

(54) ANTIGLARE FILM, POLARIZING PLATE AND IMAGE DISPLAY DEVICE

(75) Inventors: Takato Suzuki, Minami-Ashigara (JP); Shinya Kato, Minami-Ashigara (JP); Tetsuya Asakura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 757 days.

(21) Appl. No.: 12/056,087

(22) Filed: Mar. 26, 2008

(65) Prior Publication Data
US 2008/0247045 A1 Oct. 9, 2008

(30) Foreign Application Priority Data
Mar. 27, 2007 (JP) ................. P2007-081883

(51) Int. Cl.
*G02B 27/00* (2006.01)
(52) U.S. Cl. ........................................ 359/601
(58) Field of Classification Search ........... 359/601
See application file for complete search history.

(56) References Cited

U.S. PATENT DOCUMENTS

| | | | |
|---|---|---|---|
| 2005/0184412 A1* | 8/2005 | Kiso et al. .............. | 264/2.5 |
| 2005/0260392 A1* | 11/2005 | Sugino et al. ........... | 428/212 |
| 2007/0048459 A1* | 3/2007 | Takebe et al. .......... | 428/1.31 |
| 2007/0076298 A1* | 4/2007 | Murata et al. .......... | 359/601 |
| 2007/0206283 A1* | 9/2007 | Ohtani et al. ........... | 359/493 |

FOREIGN PATENT DOCUMENTS

| | | |
|---|---|---|
| JP | 2007-41533 A | 2/2007 |
| WO | WO2005/093468 * | 3/2005 |

* cited by examiner

*Primary Examiner* — Joshua L Pritchett
(74) *Attorney, Agent, or Firm* — Birch, Stewart, Kolasch & Birch, LLP

(57) ABSTRACT

An antiglare film includes a transparent support; and an antiglare layer containing a binder and a fine particle, wherein the antiglare layer has an average thickness smaller than an average particle diameter of the fine particle, and the antiglare layer has a surface roughness skewness (Rsk) of from 0.5 to 1.5.

6 Claims, 2 Drawing Sheets

ANTIGLARE FILM, POLARIZING PLATE AND IMAGE DISPLAY DEVICE

BACKGROUND OF THE INVENTION

1. Field of the Invention

The present invention relates to an antiglare film, a polarizing plate using the film, and an image display device using the film or the polarizing plate.

2. Description of the Related Art

In recent years, as an image display device for TV, a flat panel display such as LCD and PDP is rapidly spreading in place of conventionally prevailing CRT. The flat panel display for TV has heretofore a large screen size and its pixel size is large as compared with the PC monitor or the like. However, with recent realization of a highly fine pixel of the flat panel display for TV, it is demanded to prevent projection of outside light, viewer figure or the like or more enhance the image display quality such as prevention of white-brownish appearance and glaring on screen.

JP-A-2007-41533 (the term "JP-A" as used herein means an "unexamined published Japanese patent application") discloses an antiglare hardcoat film where a hardcoat layer containing a fine particle and having an irregular surface is provided on at least one surface of a transparent film substrate. In the hardcoat layer, a fine particle having an average particle diameter of 6 to 15 μm is contained, and furthermore, the hardcoat layer has a film thickness not less than the average particle diameter of the fine particle. An antiglare film satisfying the requirement to more enhance the image display quality in a recent image display device having a highly fine pixel is demanded.

In the flat panel display device, an antiglare film for preventing projection due to reflection of outside light is heretofore used, but when a conventional antiglare film is used for a flat panel having a highly fined pixel, glaring like bright point is randomly generated throughout the screen. The glaring is generated resulting from the surface irregularity working out to a lens and the pixel being thereby enlarged and is worsened as the pixel becomes finer.

SUMMARY OF THE INVENTION

An aspect of the present invention is to provide an antiglare film having sufficiently high antiglare property and ensuring less generation of glaring on screen even when used for a flat panel display having a highly fine pixel. Another aspect of the present invention is to provide a polarizing plate using the antiglare film as a protective film for a polarizing film. Still another aspect of the present invention is to provide an image display device where the antiglare film or the antiglare film of the polarizing plate is located on the viewing-side outermost surface.

As a result of intensive studies to attain these aspects, the present inventors have found the following antiglare film and accomplished the present invention.

That is, the present invention is achieved by the following means.

<1> An antiglare film comprising:
a transparent support; and
an antiglare layer containing a binder and a fine particle,
wherein
the antiglare layer has an average thickness smaller than an average particle diameter of the fine particle, and
the antiglare layer has a surface roughness skewness (Rsk) of from 0.5 to 1.5.

<2> The antiglare film as described in <1>, wherein
the average particle diameter of the fine particle is from 3 to 15 μm,
the average thickness of the antiglare layer is smaller by 0.01 to 3.0 μm than the average particle diameter of the fine particle, and
the fine particle is contained in the antiglare layer in a proportion of from 0.01 to 3 mass % based on all solid contents constituting the antiglare layer.

<3> The antiglare film as described in <1>, further comprising:
a low refractive index layer on the antiglare layer, which has a refractive index lower than a refractive index of the antiglare layer.

<4> The antiglare film as described in <3>, wherein
the low refractive index layer contains a hollow fine particle having an average particle diameter in a size corresponding to from 30 to 100% of a thickness of the low refractive index layer and having a refractive index of from 1.17 to 1.40.

<5> A polarizing plate comprising:
a polarizing film; and
a pair of protective fins between which the polarizing film is sandwiched,
wherein
either one of the pair of protective films is the antiglare film as described in <1>.

<6> An image display device comprising:
the antiglare film as described in <1> on a viewing-side outermost surface thereof.

<7> An image display device comprising:
the polarizing plate as described in <5> on a viewing-side outermost surface thereof.

DETAILED DESCRIPTION OF THE INVENTION

The present invention is described in detail below.

Here, the expression "from (numerical value 1) to (numerical value 2)" as used in the context of the present invention for indicating a physical value, a characteristic value or the like means "(numerical value 1) or more and (numerical value 2) or less". Also, the term "(meth)acrylate" means "at least either acrylate or methacrylate". The same applies to "((meth)acrylic acid" and the like.

<Antiglare Film>
[Construction of Antiglare Film]

The antiglare film of the present invention comprises a transparent support having thereon at least one antiglare layer containing a fine particle and a binder. The antiglare film of the present invention is described by referring to FIG. 1.

Figure 1:
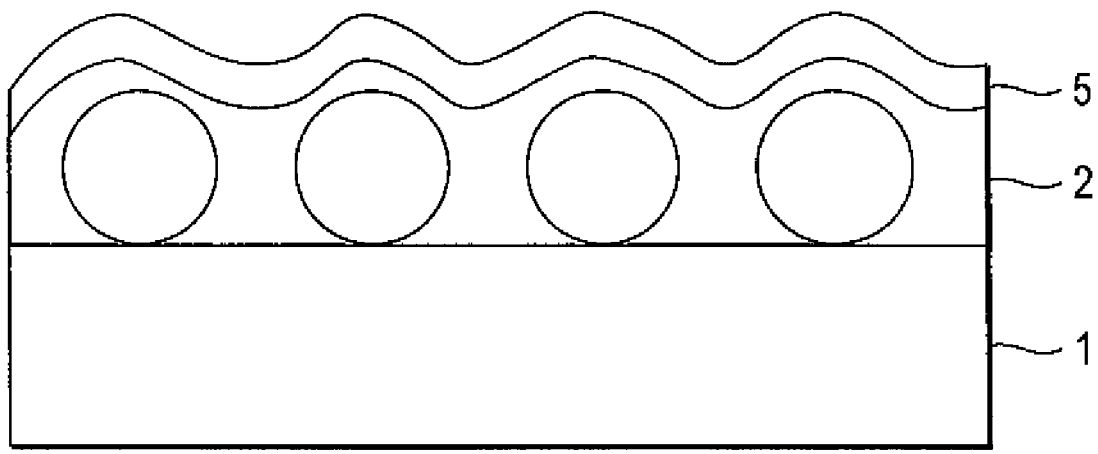
FIG. 1 is a rough cross-sectional view schematically showing the preferred embodiment of the antiglare film of the present invention.

FIG. 1 is a rough sectional view schematically showing a preferred embodiment of the antiglare film of the present invention.

The antiglare film of FIG. 1 has one antiglare layer (2) on a transparent support (1). It is preferable that a low refractive index layer (5) having a refractive index layer lower than the refractive index of the adjacent antiglare layer (2) is provided as the outermost layer.

[Antiglare Layer]

The antiglare film of the present invention is an antiglare film comprising a transparent support having thereon at least one antiglare layer containing a binder and a fine particle, wherein the average thickness of the antiglare layer is smaller than the average particle diameter of the fine particle, and the surface roughness skewness (Rsk) of the antiglare layer is from 0.5 to 1.5.

Here, the surface roughness skewness (Rsk) can be measured using a surface roughness measuring instrument, "SURFCORDER SE3500", manufactured by Kosaka Laboratory Ltd.

The surface roughness Ra is an average of absolute values of "height" (hereinafter referred to as "Z(x)") in a reference length and is represented by the following formula:

$$Ra = \frac{1}{l_r}\int_0^{l_r} |Z(x)|\, dx$$

$l_r$: reference length.

Also, the surface skewness (Rsk) is a value obtained by dividing the cubic mean of Z(x) in the reference length by the cube of root-mean-square and is represented by the following formula:

TABLE 1

$$Rsk = \frac{1}{Rq^3}\left[\frac{1}{l_r}\int_0^{l_r} Z^3(x)\, dx\right]$$

$$Rq = \sqrt{\frac{1}{l_r}\int_0^{l_r} Z^2(x)\, dx}$$

| Evaluation of Ra, Rsk | | Evaluation of Sm | | Measurement Conditions | |
|---|---|---|---|---|---|
| Range of Ra (μm) | | Range of Sm (mm) | | Reference Length | Evaluation Length |
| more than | or less | more than | or less | (mm) | (mm) |
| 0.006 | 0.02 | 0.013 | 0.04 | 0.08 | 0.4 |
| 0.02 | 0.1 | 0.04 | 0.13 | 0.25 | 1.25 |
| 0.1 | 2 | 0.13 | 0.4 | 0.8 | 4 |

When Rsk is 0.5 or more, the portion showing the lens effect in the antiglare film decreases, and the glaring can be improved. If the Rsk exceeds 1.5, the flat part in the antiglare film surface is excessively increased, and the antiglare property cannot be ensured. Therefore, Rsk is preferably from 0.5 to 1.5, because the performance in terms of both glaring and antiglare property can be satisfied in this range.

The average particle diameter of the fine particle contained in the antiglare layer is preferably from 3 to 15 μm, more preferably from 5 to 10 μm. The average particle diameter of the fine particle is determined by observing the antiglare film through an electron microscope and calculating the particle diameter front the average of diameters of 10 particles.

The average thickness of the antiglare layer is preferably smaller by 0.01 to 3.0 μm than the average particle diameter of the fine particle. The average thickness of the antiglare layer is determined by observing the cross-section of the antiglare film through an electron microscope and calculating the film thickness from the average of the thickness values randomly measured at 10 portions.

One convex part of the antiglare layer is preferably formed by substantially 4 or less fine particles. More preferably, the convex part is formed by substantially 1 fine particle. The term "substantially" as used herein means that out of the convex parts defined above, 90% or more satisfies the preferred embodiment.

The arithmetic mean roughness (Ra) is preferably from 0.06 to 0.50 μm, more preferably from 0.09 to 0.3 μm. When Ra is in this range, an antiglare film reduced in the white-brownish appearance of the screen while ensuring the antiglare property can be obtained.

The average distance Sm of irregularities is preferably from 50 to 500 μm, more preferably from 70 to 400 μm. When Sm is in this range, an antiglare film reduced in the white-brownish appearance of the screen while ensuring the antiglare property can be obtained.

The surface roughness can be measured, similarly to the measurement of Rsk, by using a surface roughness measuring instrument "SURFCORDER SE3500", manufactured by Kosaka Laboratory Ltd. The measuring conditions in the measurement are set to the same measuring conditions as those at the measurement of Rsk.

(Fine Particle)

The kind of the fine particle is not particularly limited as long as the above-described particle diameter and the internal haze value of the antiglare layer, which is described later, are satisfied, but since the convex part is preferably formed by substantially 1 fine particle, a fine particle with good dispersibility is preferably selected.

The fine particle with good dispersibility is preferably a light-transparent organic resin particle such as polymethyl methacrylate fine particle and polymethyl methacrylate-polystyrene copolymer fine particle. The proportion of the polymethyl methacrylate in the copolymer fine particle is preferably 40 mass % or more in view of dispersibility.

In the case of using the above-described One particle, for the purpose of stabilizing the dispersion or preventing the precipitation of the particle in the binder or coating solution, an inorganic filler in a size not causing scattering of visible light, such as silica, or a dispersant such as organic compound (may be either a monomer or a polymer), may be added.

In the case of adding an inorganic filler, as the amount added thereof is increased, this is more effective in preventing the precipitation of the fine particle, but the inorganic filler is preferably used within the range not adversely affecting the transparency of the coating. Accordingly, it is preferred that an inorganic filler having a particle diameter of 0.5 μm or less is contained in an amount of about 0.1 mass % based on the binder to an extent of not impairing the transparency of the coating. The dispersant such as organic compound is preferably added in an amount of 0.1 to 20 mass %, more preferably from 0.1 to 15 mass %, still more preferably from 0.5 to 10 mass %, based on the fine particle. When the dispersant content is 0.1 mass % or more, the addition effect on the dispersion stability is obtained, and when the content is 20 mass % or less, a problem such as bleed-out resulting from increase of the component not contributing to dispersion stability does not arise and this is preferred.

As described above, for the purpose of stabilizing the dispersion or preventing the precipitation in the binder or coating solution, the surface of the fine particle used as an additive may be surface-treated. The kind of the surface-treating agent is appropriately selected according to the binder used or the solvent in the coating solution. The surface-treating agent is preferably added in an amount of 0.1 to 30 mass %, more preferably from 1 to 25 mass %, still more preferably from 3 to 20 mass %, based on the fine particle. When the amount of the surface-treating agent added is 0.1 mass % or more, the surface treatment amount is sufficient for the dispersion stability, and when the amount added is 30 mass % or less, a problem such as bleed-out resulting from increase of the component not contributing to dispersion stability does not arise and this is preferred.

In the present invention, as for the particle size distribution of the fine particle used, a monodisperse particle, that is, a particle having a uniform particle diameter, is preferred in view of control of the haze value or diffusibility and homogeneity of the coated surface state. The CV value indicating the uniformity of the particle diameter is preferably from 0 to 10%, more preferably from 0 to 8%, still more preferably from 0 to 5%. Furthermore, when a particle having a particle diameter 20% or more larger than the average particle diameter is defined as a coarse particle, the percentage of the coarse particle is preferably 1% or less, more preferably 0.1% or less, still more preferably 0.01% or less, of the number of all particles. For obtaining the fine particle having such a particle size distribution, classification performed after preparation or synthesis reaction is effective, and by increasing the number of classifications or elevating the level of classification, a particle having a desired distribution can be obtained. The classification is preferably performed using a method such as air classification, centrifugal classification, precipitation classification, filtration classification and electrostatic classification. The average particle diameter of the fine particle is determined by observing the fine particles through an electron microscope and calculating the particle diameter from the average of diameters of 10 particles observed.

In order to obtain the necessary light-scattering property, two or more kinds of fine particles differing in the average particle diameter may be used in combination.

The above-described fine particle is blended to occupy from 0.01 to 3 mass %, more preferably from 0.05 to 2 mass %, still more preferably from 0.1 to 1 mass %, in the entire solid content of the antiglare layer. When the amount of the fine particle added is in the range above, the number of particles having an average particle diameter larger than the average film thickness of the antiglare layer becomes from 1 to 500 per 1 $mm^2$ of the antiglare film. The number of particles per 1 $mm^2$ of the antiglare film can be calculated by photographing the film surface by an optical microscope and counting the number of particles present within 1 $mm^2$.

By using the fine particle in this range and setting the average film thickness to the above-described range, an antiglare film capable of reducing the white-brownish appearance of the screen while satisfying both performances in terms of glaring and antiglare property can be stably produced.

(Binder)

The binder of the antiglare layer for use in the present invention is preferably formed by containing and curing either one or both of a thermosetting resin and an ionizing radiation-curable compound.

The antiglare layer for use in the present invention is preferably a layer formed by a crosslinking reaction or polymerization reaction of an ionizing radiation-curable compound. More specifically, the layer is formed by coating a coating composition containing an ionizing radiation-curable polyfunctional monomer or polyfunctional oligomer on a transparent support and causing a crosslinking reaction or polymerization reaction of the polyfunctional monomer or polyfunctional oligomer. The functional group in the ionizing radiation-curable polyfunctional monomer or polyfunctional oligomer is preferably a photo(ultraviolet)-, electron beam- or radiation-polymerizable functional group, more preferably a photopolymerizable functional group. Examples of the photopolymerizable functional group include an unsaturated polymerizable functional group such as (meth)acryloyl group, vinyl group, styryl group and allyl group, with a (meth)acryloyl group being preferred.

Specific examples of the photopolymerizable polyfunctional monomer having a photopolymerizable functional group include (meth)acrylic acid diesters of alkylene glycol, such as neopentyl glycol di(meth)acrylate, 1,6-hexanediol di(meth)acrylate and propylene glycol di(meth)acrylate; (meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate; (meth)acrylic acid polyesters of polyhydric alcohol, such as pentaerythritol di(meth)acrylate, pentaerythritol tri(meth)acrylate and trimethylolpropane tri(meth)acrylate; and (meth)acrylic acid diesters of ethylene oxide or propylene oxide adduct, such as 2,2-bis{4-(acryloxy.diethoxy)phenyl}propane and 2-2-bis{4-(acryloxy.polypropoxy)phenyl}propane. Furthermore, epoxy(meth)acrylates, urethane(meth)acrylates and polyester(meth)acrylates may also be preferably used as a photopolymerizable polyfunctional monomer.

Among these, esters of a polyhydric alcohol and a (meth)acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, dipentaerythritol triacrylate, dipentaerythritol pentaacrylate, dipentaerythritol tetra (meth)acrylate, dipentaerythritol hexa(meth)acrylate, tripentaerythritol triacrylate and tripentaerythritol hexatriacrylate.

For controlling the refractive index of each layer, monomers differing in the refractive index can be used as the polyfunctional monomer binder. In particular, examples of the high refractive index monomer include bis(4-methacryloylthiophenyl)sulfide, vinylnaphthalene, vinylphenyl sulfide and 4-methacyloxyphenyl-4'-methoxyphenyl thioether. Furthermore, dendrimers described, for example, in JP-A-2005-76005 and JP-A-2005-36105, and norbornene ring-containing monomers described, for example, in JP-A-2005-60425 may also be used. As for the binder, two or more kinds of these polyfunctional monomer or polyfunctional oligomer binders may be used in combination.

The refractive index of the antiglare layer can be quantitatively evaluated, for example, by directly measuring the refractive index with an Abbe refractometer or by measuring the spectral reflection spectrum or spectral ellipsometry. The refractive index of the above-described fine particle is determined as follows. The fine particle is dispersed in equal amounts in solvents prepared by changing he mixing ratio of two kinds of solvents differing in the refractive index and thereby varying the refractive index, the turbidity is measured, and the refractive index of the solvent when the turbidity becomes minimum is measured by an Abbe refractometer.

The polymerization of such a binder having an ethylenically unsaturated group may be performed by the irradiation of ionizing radiation or under heating in the presence of a photoradical initiator or a thermal radical initiator. In the polymerization reaction of the photopolymerizable polyfunctional monomer or polyfunctional oligomer, a photopolymerization initiator is preferably used, and the photopolymerization initiator is preferably a photoradical polymerization initiator or a photocationic polymerization initiator, more preferably a photoradical polymerization initiator.

In the present invention, a polymer or a crosslinked polymer can be used in combination as the binder. The crosslinked polymer preferably has an anionic group. The crosslinked polymer having an anionic group has a structure that the main chain of the polymer having an anionic group is crosslinked.

Examples of the polymer main chain include polyolefin (saturated hydrocarbon), polyether, polyurea, polyurethane, polyester, polyamine, polyamide and melamine resin. A polyolefin main chain, a polyether main chain and a polyurea main chain are preferred, a polyolefin main chain and a polyether main chain are more preferred, and a polyolefin main chain is most preferred.

In the binder of the antiglare layer, for the purpose of controlling the refractive index of the antiglare layer, a high refractive index monomer, an inorganic particle incapable of producing visible light scattering, that is, an inorganic particle having an average particle size of 100 nm or less, such as $ZrO_2$, $TiO_2$ and $SiO_2$, or both may be added. The inorganic particle has an effect of suppressing the curing shrinkage due to a crosslinking reaction, in addition to the effect of controlling the refractive index. In the present invention, the polymer produced by the polymerization of the above-described polyfunctional monomer and/or high refractive index monomer or the like after the formation of the antiglare layer is, including the inorganic particle dispersed therein, referred to as a binder.

The internal haze used in the present invention is described in detail below.

After adding several silicone oil drops on the front and back surfaces of the antiglare film, the film is sandwiched front and back by two 1 mm-thick glass plates (Microslide Glass No. S9111, produced by Matsunami K.K.), the haze is measured according to JIS-K7136 in the state of two glass plates being put into complete contact with the antiglare film obtained, and the value obtained by subtracting, from this haze value, the haze separately measured by interposing only the silicone oil between two glass plates is calculated as the internal haze.

The internal haze of the antiglare film of the present invention is preferably from 0.1 to 25% in view of no generation of glaring and no reduction in the contrast, and the internal haze is more preferably from 1 to 20%, still more preferably from 3 to 15%.

The refractive index of the antiglare layer is preferably from 1.45 to 1.6, more preferably from 1.46 to 1.57, still more preferably from 1.47 to 1.55.

[Low Refractive Index Layer]

In the present invention, a low refractive index layer may be provided on the outer side than the antiglare layer, that is, on the remoter side from the transparent support. By virtue of having a low refractive index layer, an antireflection function can be imparted to the antiglare film and the antiglare property can be more enhanced. The refractive index of the low refractive index layer is preferably set to be lower than the refractive index of the antiglare layer. If the difference in the refractive index between the low refractive index layer and the antiglare layer is too small, the antireflectivity is liable to decrease, whereas if the difference is excessively large, the tint of reflected light tends to be intensified. The difference in the refractive index between the low refractive index layer and the antiglare layer is preferably from 0.01 to 0.30, more preferably from 0.05 to 0.20.

Here, the reflectance of a film obtained by coating a coating solution for low refractive index layer on a normal antiglare film generally becomes higher than the reflectance of a film obtained by coating the coating solution for low refractive index layer on a smooth surface. This is presumed to occur because the solution coated on the peak part of the antiglare layer flows into the trough part during drying of the low refractive index layer, as a result, the film thickness of the low refractive index layer becomes non-uniform and ideal optical interference cannot be achieved over the entire area of the film surface.

Figure 2:
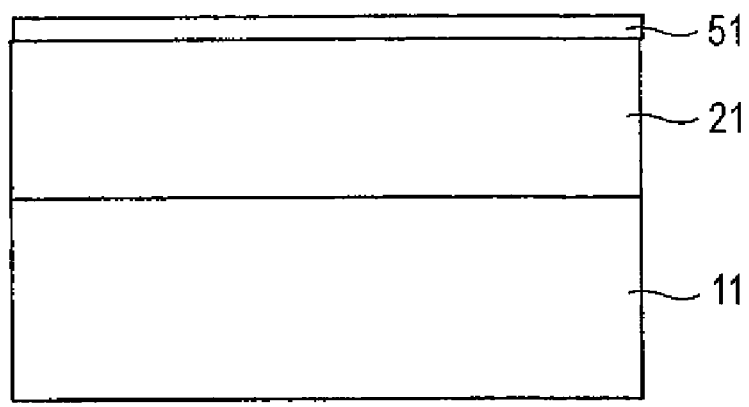
FIG. 2 is a rough cross-sectional view schematically showing an embodiment where a low refractive index layer is coated on a smooth surface.
Figure 3:
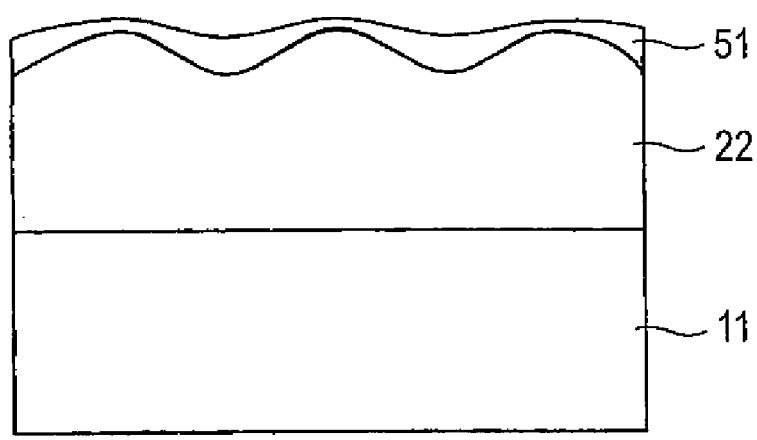
FIG. 3 is a rough cross-sectional view schematically showing an embodiment where a low refractive index layer is coated on a normal antiglare film.
Figure 4:
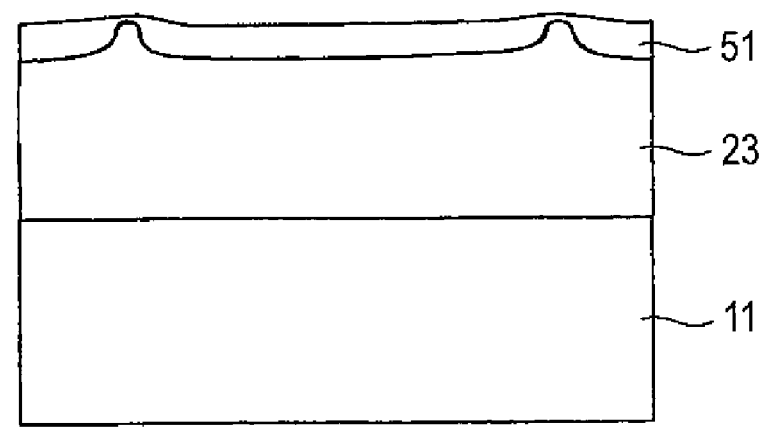
FIG. 4 is a rough cross-sectional view schematically showing an embodiment where a low refractive index layer is coated on the antiglare film of the present invention,
wherein
1 denotes Transparent support;
2 denotes Antiglare layer;
5 denotes tow Low refractive index layer;
11 denotes Transparent support;
21 denotes Smooth layer;
22 denotes Antiglare layer;
23 denotes Antiglare layer; and
51 denotes Low refractive index layer.

However, surprisingly, the reflectance of a film obtained by coating a coating solution for low refractive index layer on the antiglare film of the present invention is nearly equal to the reflectance of a film obtained by coating the coating solution for low refractive index layer an a smooth surface. This is presumed to occur because the proportion of a smooth part in the film of the present invention is larger than that in a normal antiglare film and therefore, ideal optical interference can be achieved almost over the entire area of the film surface. In other words, when a low refractive index layer is coated on the antiglare film of the present invention, the reflectance significantly decreased as compared with other antiglare films, so that the white-brownish appearance of the screen can be advantageously more suppressed. Conceptual views for explaining this are shown below. FIG. 2 shows a case where a low refractive index layer is coated on a smooth surface, FIG. 3 shows a case where a low refractive index layer is coated on a normal antiglare film, and FIG. 4 shows a case where a low refractive index layer is coated on the antiglare film of the present invention.

The low refractive index layer can be formed using a low refractive index material. As for the low refractive index material, a low refractive index binder may be used. The low refractive index layer may also be formed using a binder having added thereto a fine particle.

Also, the low refractive index layer may contain an organosilane compound which will be described later.

As for the low refractive index binder, a fluorine-containing copolymer may be preferably used. The fluorine-containing copolymer preferably has a constituent unit derived from a fluorine-containing monomer and a constituent unit for imparting crosslinking property.

(Fluorine-Containing Copolymer)

Examples of the fluorine-containing vinyl monomer mainly constituting the fluorine-containing copolymer include fluoroolefins (e.g., fluoroethylene, vinylidene fluoride, tetrafluoroethylene, hexafluoropropylene), partially or completely fluorinated alkyl ester derivatives of (meth) acrylic acid {e.g., "VISCOAT 6FM" (trade name) produced by Osaka Organic Chemical Industry Ltd., "R-2020" (trade name) produced by Daikin Industries, Ltd.}, and completely or partially fluorinated vinyl ethers. Among these, perfluoroolefins are preferred, and in view of refractive index, solubility, transparency, availability and the like, hexafluoropropylene is more preferred.

When the compositional ratio of the fluorine-containing vinyl monomer is increased, the refractive index may be lowered but the film strength tends to decrease. In the present invention, the fluorine-containing vinyl monomer is preferably introduced such that the copolymer has a fluorine content of 20 to 60 mass %, more preferably from 25 to 55 mass %, still more preferably from 30 to 50 mass %.

The constituent unit for imparting crosslinking reactivity mainly includes the following units (A), (B) and (C):

(A): a constituent unit obtained by the polymerization of a monomer previously having a self-crosslinking functional group within the molecule, such as glycidyl(meth)acrylate and glycidyl vinyl ether, (B): a constituent unit obtained by tile polymerization of a monomer having a carboxyl group, a hydroxy group, an amino group, a sulfo group or the like {such as (meth)acrylic acid, methylol(meth)acrylate, hydroxyalkyl(meth)acrylate, allyl acrylate, hydroxyethyl vinyl ether, hydroxybutyl vinyl ether, maleic acid and crotonic acid}, and (C): a constituent unit obtained by reacting a compound having a group capable of reacting with the functional group of (A) or (B) above and another crosslinking functional group within the molecule, with the constituent unit of (A) or (B) above (for example, a constituent unit which can be synthesized by a method of causing an acrylic acid chloride to act on a hydroxyl group).

In the constituent unit of (C)) the crosslinking functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. Not only one of these groups but also two or more kinds thereof may be contained. Among these, a (meth)acryloyl group and a cinnamoyl group are preferred, and a (meth)acryloyl group is more preferred.

The specific method for preparing the photopolymerizable group-containing copolymer includes, but is not limited to, the following methods:

a. a method of reacting a (meth)acrylic acid chloride with a crosslinking functional group-containing copolymer having a hydroxyl group, thereby effecting esterification, b. a method of reacting an isocyanate group-containing (meth)acrylic acid ester with a crosslinking functional group-containing copolymer having a hydroxyl group, thereby effecting urethanization, c. a method of reacting a (meth)acrylic acid with a crosslinking functional group-containing copolymer having an epoxy group, thereby effecting esterification, and d. a method of reacting an epoxy group-containing (meth)acrylic acid ester with a crosslinking functional group-containing copolymer having a carboxyl group, thereby effecting esterification.

The amount of the photopolymerizable group introduced can be arbitrarily adjusted and, for example, from the standpoint of stabilizing the coating surface state, reducing the surface state failure when an inorganic particle is present together, or enhancing the film strength, a carboxyl group, a hydroxyl group or the like may remain.

In the present invention, the amount introduced of the constituent unit for imparting crosslinking property in the copolymer is preferably from 10 to 50 mol %, more preferably from 15 to 45 mol %, still more preferably from 20 to 40 mol %.

In the copolymer useful for low refractive index layer of the present invention, in addition to the repeating unit derived from the fluorine-containing vinyl monomer and the constituent unit for imparting crosslinking property, other vinyl monomers may be appropriately copolymerized from various viewpoints such as adhesion to substrate, Tg (contributing to film hardness) of polymer, solubility in solvent, transparency, slipperiness, dust protection and antifouling property. A plurality of these vinyl monomers may be combined according to the purpose, and these monomers are preferably introduced to account for, in total, from 0 to 65 mol %, more preferably from 0 to 40 mol %, still more preferably from 0 to 30 mol %, in the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and acrylonitrile.

The fluorine-containing copolymer particularly useful in the present invention is a random copolymer of perfluoroolefin with vinyl ethers or vinyl esters. In particular, the fluorine-containing polymer preferably has a group capable of undergoing a crosslinking reaction by itself {for example, a radical reactive group such as (meth)acryloyl group, or a ring-opening polymerizable group such as epoxy group and oxetanyl group}. The crosslinking reactive group-containing polymerization unit preferably occupies front 5 to 70 mol %, more preferably from 30 to 60 mol %, in all polymerization units of the polymer. Preferred examples of the polymer include those described in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

For the purpose of imparting antifouling property, a polysiloxane structure is preferably introduced into the fluorine-containing polymer useful in the present invention. The method for introducing a polysiloxane structure is not limited, but preferred examples thereof include a method of introducing a polysiloxane block copolymerization component by using a silicone macroazo initiator described in JP-A-6-93100, JP-A-11-189621, JP-A-11-228631 and JP-A-2000-313709; and a method of introducing a polysiloxane graft copolymerization component by using a silicone macromer described in JP-A-2-251555 and JP-A-2-308806. Particularly preferred compounds include the polymers in Examples 1, 2 and 3 JP-A-11-189621, and Copolymers A-2 and A-3 of JP-A-2-251555. The content of the polysiloxane component in the polymer is preferably from 0.5 to 10 mass %, more preferably from 1 to 5 mass %.

The molecular weight of the copolymer which can be preferably used in the present invention is, in terms of the mass average molecular weight, preferably 5,000 or more, more preferably from 10,000 to 500,000, and most preferably from 15,000 to 200,000. It is also possible to improve the coating surface state or scratch resistance by using polymers differing in the average molecular weight in combination.

A curing agent having a polymerizable unsaturated group described in JP-A-10-25388 and JP-A-2000-17028 may be appropriately used in combination with the above-described copolymer. Furthermore, as described in JP-A-2002-145952, use in combination with a compound having a fluorine-containing polyfunctional polymerizable unsaturated group is also preferred. Examples of the compound having a polyfunctional polymerizable unsaturated group include the polyfunctional monomers described above for the antiglare layer. Among these compounds, a compound having a polymerizable unsaturated group in the polymer main body is preferred because use of the compound in combination produces a great effect on the improvement of scratch resistance.

The refractive index of the low refractive index layer is preferably from 1.20 to 1.46, more preferably from 1.25 to 1.42, still more preferably from 1.30 to 1.38. The thickness of the low refractive index layer is preferably from 50 to 150 nm, more preferably from 70 to 120 nm.

(Fine Particle)

The fine particle which can be preferably used in the low refractive index layer of the present invention is described below.

The coated amount of the fine particle contained in the low refractive index is preferably from 1 to 100 mg/m$^2$, more preferably from 1 to 80 mg/m$^2$, still more preferably from 1 to 70 mg/m$^2$. When the coated amount of the fine particle is not less than the lower limit above, the effect of improving the scratch resistance is distinctly brought out, mad when the coated amount is not more than the upper limit above, there is advantageously not caused such a problem that fine irregularities are generated on the low refractive index layer surface to deteriorate the outer appearance or integrated reflectance. The fine particle is incorporated into the low refractive index layer and therefore, preferably has a low refractive index.

Specifically, the fine particle contained in the low refractive index layer is preferably an inorganic fine particle, a hollow fine particle or a hollow organic resin fine particle, each having a low refractive index, more preferably a hollow inorganic fine particle. Examples of the inorganic fine particle include a silica fine particle and a hollow silica fine particle. The average particle diameter of this fine particle is preferably from 30 to 100%, more preferably from 30 to 80%, still more preferably from 35 to 70%, of the thickness of the low refractive index layer. In other words, when the thickness of the low refractive index layer is 100 nm, the particle diameter of the fine particle is preferably from 30 to 100 nm, more preferably from 30 to 80 nm, still more preferably from 35 to 70 nm.

For increasing the scratch resistance, the inorganic particle is preferably contained in all layers of the antiglare film, and it is most preferred that a silica particle is contained in all layers of the antiglare film.

When the particle diameter of the (hollow) silica fine particle is not less than the lower limit above, the effect of improving the scratch resistance is distinctly brought out, and when it is not more than the upper limit above, there is advantageously not caused such a problem that fine irregularities are generated on the low refractive index layer surface to deteriorate the outer appearance or integrated reflectance.

The (hollow) silica fine particle may be either crystalline or amorphous and may be a monodisperse particle or an aggregated particle (in this case, the secondary particle diameter is preferably front 30 to 100% of the thickness of the low refractive index layer). Also, a plurality of two or more kinds of particles (differing in the kind or particle diameter) may be used. The shape of the particle is most preferably spherical but even if an indefinite form, there arises no problem.

In order to reduce the refractive index of the low refractive index layer, a hollow silica fine particle is preferably used. The refractive index of the hollow silica fine particle is preferably from 1.17 to 1.40, more preferably from 1.17 to 1.35, still more preferably from 1.17 to 1.30. The refractive index as used herein indicates the refractive index of the particle as a whole and does not indicate the refractive index of only the outer shell silica forming the hollow silica fine particle. At this time, assuming that the radius of the cavity inside the particle is $r_i$ and the radius of the outer shell of the particle is $r_o$, the porosity x is calculated according to the following mathematical formula (1):

$$x=(4\pi r_i^3/3)/(4\pi r_o^3/3)\times 100 \quad \text{Mathematical Formula (1)}$$

The porosity x is preferably from 10 to 60%, more preferably from 20 to 60%, and most preferably from 30 to 60%. If the hollow silica particle is intended to have a lower refractive index and a higher porosity, the thickness of the outer shell becomes small and the strength as a particle decreases. Therefore, in view of the scratch resistance, a particle having a low refractive index of less than 1.17 is hardly usable. Incidentally, the refractive index of the hollow silica particle is measured by an Abbe refractometer {manufactured by ATAGO K.K.}.

In the present invention, from the standpoint of enhancing the antifouling property, the surface free energy on the low refractive index layer surface is preferably reduced. Specifically, a fluorine-containing compound or a compound having a polysiloxane structure is preferably used in the low refractive index layer.

As for the additive having a polysiloxane structure, addition of a reactive group-containing polysiloxane {for example, "KF-100T", "X-22-169AS", "KF-102", "X-22-3701IE", "X-22-164B", "X-22-5002", "X-22-173B", "X-22-174D", "X-22-167B" and "X-22-161AS" (trade names), all produced by Shin-Etsu Chemical Co., Ltd.; "AK-5", "AK-30" and "AK-32" (trade names), al produced by Toagosei Chemical Industry Co., Ltd.; "SILAPLANE FM0725" and "SILAPLANE FM0721" (trade names), both produced by Chisso Corp.} is also preferred. Furthermore, silicone-based compounds described in Tables 2 and 3 of JP-A-2003-112383 may also be preferably used. Such a polysiloxane is preferably added in an amount of 0.1 to 10 mass %, more preferably from 1 to 5 mass %, based on the entire solid content of the low refractive index layer.

[Other Components Contained in Composition for Formation of Antiglare Layer and/or Low Refractive Index Layer]
[Organosilane Compound]

In view of scratch resistance, at least one layer out of the layers constituting the antiglare film of the present invention is preferably formed using at least one component, so-called sol component (hereinafter, sometimes referred to in this way), selected from a hydrolysate of an organosilane compound and/or a partial condensate thereof. Particularly, in the antiglare film having a low refractive index layer, the sol component is preferably incorporated into the low refractive index layer so as to satisfy both the antireflection performance and the scratch resistance. This sol component forms a cured product by undergoing condensation during drying and heating after coating and works out to a part of the binder in the low refractive index layer. Furthermore, in the case where the cured product has a polymerizable unsaturated bond, a binder having a three-dimensional structure is formed upon irradiation with actinic rays.

The organosilane compound is preferably an organosilane compound represented by the following formula (1):

$(R^{11})_{m1}$—Si$(X^{11})_{4-m1}$    Formula (1)

In formula (1), $R^{11}$ represents a substituted or unsubstituted alkyl group or a substituted or unsubstituted aryl group. The alkyl group is preferably an alkyl group having a carbon number of 1 to 30, more preferably from 1 to 16, still more preferably from 1 to 6. Specific examples of the alkyl group include methyl, ethyl, propyl, isopropyl, hexyl, decyl and hexadecyl. Examples of the aryl group include phenyl and naphthyl, with a phenyl group being preferred.

$X^{11}$ represents a hydroxyl group or a hydrolyzable group, and examples thereof include an alkoxy group (preferably an alkoxy group having a carbon number of 1 to 5, e.g., methoxy, ethoxy), a halogen atom (e.g., Cl, Br, I) and a group represented by $R^{12}$COO (wherein $R^{12}$ is preferably a hydrogen atom or an alkyl group having a carbon number of 1 to 6; e.g., $CH_3$COO, $C_2H_5$COO). Among these, an alkoxy group is preferred, and a methoxy group and an ethoxy group are more preferred. m1 represents an integer of 1 to 3 and is preferably 1 or 2.

When a plurality of $X^{11}$'s are present, the plurality of $X^{11}$'s may be the same or different. The substituent contained in $R^{11}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), am alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e, g, carbamoyl, N-methylcarbamoyl, N,N-dimethylcarbamoyl, N-methyl-N-octylcarbamoyl), and an acylamino group (e.g., acetylamino, benzoylamino, acrylamino, methacrylamino). These substituents each may be further substituted. $R^{11}$ is preferably a substituted alkyl group or a substituted aryl group.

An organosilane compound having a vinyl polymerizable substituent represented by the following formula (2) is also preferred.

Formula (2):

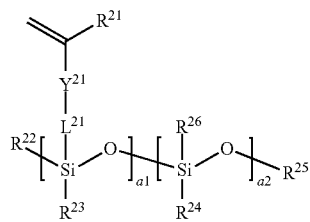

In formula (2), $R^{21}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^{21}$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

$Y^{21}$ represents a single bond, *—COO—**, *—CONH—** or *—O—** and is preferably a single bond, *—COO—** or *—CONH—**, more preferably a single bond or *—COO—**, still more preferably *—COO—**. * denotes the position bonded to =C($R^{21}$)— and ** denotes the position bonded to $L^{21}$.

$L^{21}$ represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. Among these, preferred are a substituted or unsubstituted alkylene group, a substituted or unsubstituted arylene group, and an alkylene group having in the inside thereof a linking group, more preferred are an unsubstituted alkylene group, an unsubstituted arylene group and an alkylene group having in the inside thereof an ether or ester linking group, and still more preferred are an unsubstituted alkylene group and an alkylene group having in the inside thereof an ether or ester linking group. Examples of the substituent include a halogen, a hydroxyl group, a mercapto group, a carboxyl group, an epoxy group, an allyl group and an aryl group. These substituents each may be further substituted.

a1 (which represents a number satisfying the mathematical formula: a1=100−a2) and a2 each represents a molar ratio. a2 represents a number of 0 to 50, and a2 is preferably a number of 0 to 40, more preferably a number of 0 to 30.

$R^{22}$ to $R^{24}$ each is preferably a halogen atom, a hydroxyl group, an unsubstituted alkoxy group or an unsubstituted alkyl group. $R^{22}$ to $R^{24}$ each is more preferably a chlorine atom, a hydroxyl group or an unsubstituted alkoxy group having a carbon number of 1 to 6, still more preferably a hydroxyl group or an alkoxy group having a carbon number of 1 to 3, yet still more preferably a hydroxyl group or a methoxy group. $R^{25}$ represents a hydrogen atom, an alkyl group, an alkoxy group, an alkoxycarbonyl group, a cyano group, a fluorine atom or a chlorine atom. Examples of the alkyl group include a methyl group and an ethyl group; examples of the alkoxy group include a methoxy group and an ethoxy group; and examples of the alkoxycarbonyl group include a methoxycarbonyl group and an ethoxycarbonyl group. $R^{25}$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group. $R^{26}$ has the same meaning as $R^{11}$ in formula (1) and is preferably a hydroxyl group or an unsubstituted alkyl group, more preferably a hydroxyl group or an alkyl group having a carbon number of 1 to 3, still more preferably a hydroxyl group or a methyl group.

Two or more kinds of the compounds represented by formula (1) may be used in combination. The compound of formula (2) is synthesized using at least one kind of the compound of formula (1) as the starting material. Specific examples of the compound represented by formula (1) and the starting material for the compound represented by formula (2) are set forth below, but the present invention is not limited thereto.

M-1 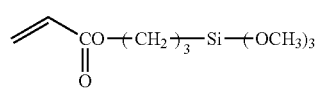
M-2 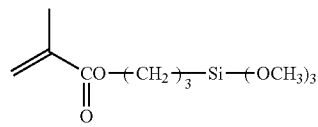
M-3 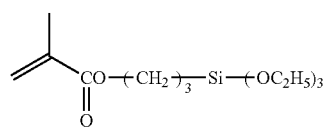
M-4 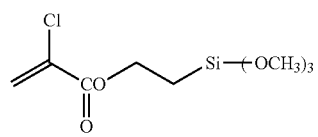
M-5 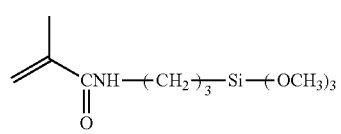
M-6 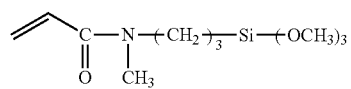
M-7 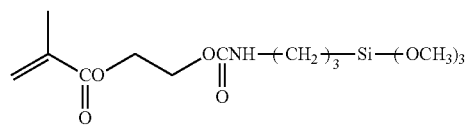
M-8 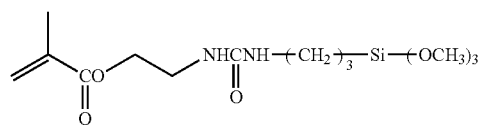
M-9 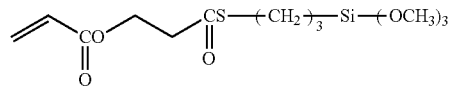
M-10 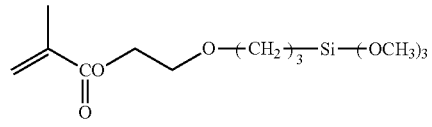
M-11 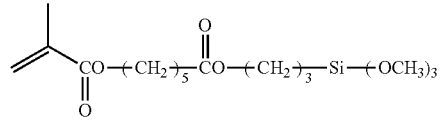
M-12 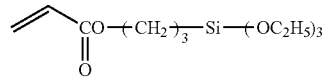
M-13 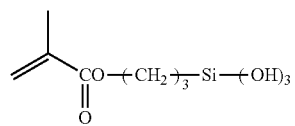
M-14 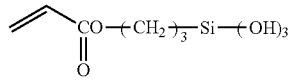
M-15 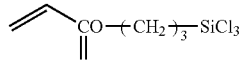
M-16 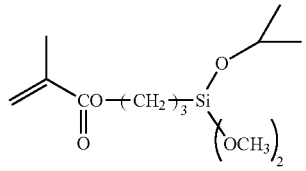
M-17 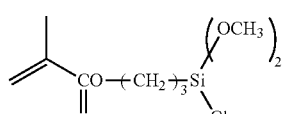
M-18 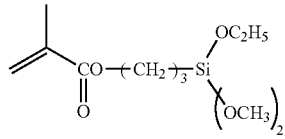
M-19 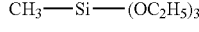
M-20 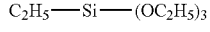
M-21 t-C$_4$H$_9$—Si—(OCH$_3$)$_3$
M-22 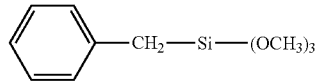
M-23 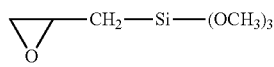
M-24 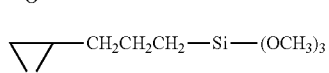
M-25 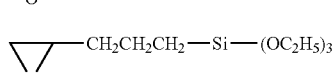
M-26 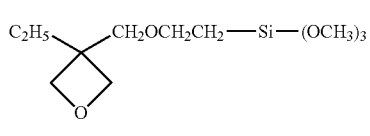
M-27 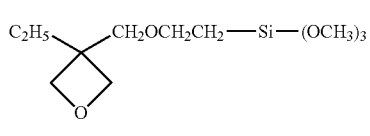
M-28 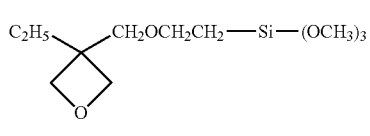
M-29 C$_3$F$_7$CH$_2$CH$_2$—Si—(OC$_2$H$_5$)$_3$
M-30 C$_6$F$_{13}$CH$_2$CH$_2$—Si—(OC$_2$H$_5$)$_3$
M-31 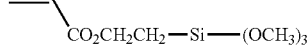

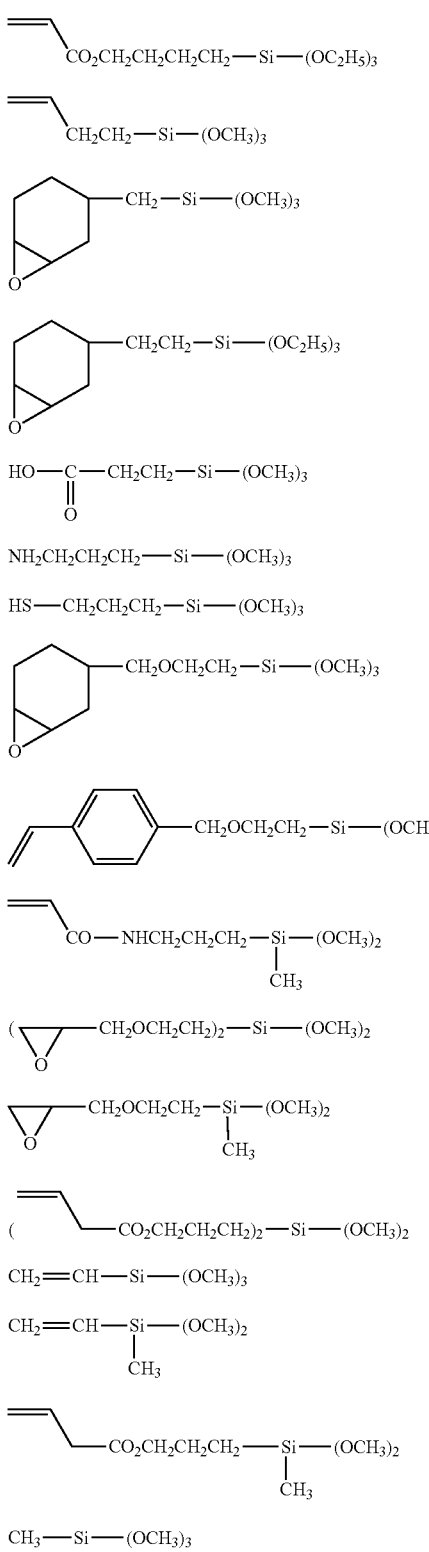

Among these, (M-1), (M-2) and (M-25) are preferred as the organosilane containing a polymerizable group.

In order to obtain the effect of the present invention, the content of the vinyl polymerizable group-containing organosilane in the hydrolysate of organosilane and/or the partial condensate thereof is preferably from 30 to 100 mass %, more preferably from 50 to 100 mass %, still more preferably from 70 to 95 mass %. When the content of the vinyl polymerizable group-containing organosilane is 30 mass % or more, this is preferred because there is not caused such a problem that a solid matter is produced in the coating solution for the formation of the antiglare layer and/or the low refractive index layer, the liquid is clouded, the pot life is worsened or the molecular weight is difficult to control (increase of the molecular weight) or such a problem that when a polymerization treatment is performed, the performance (for example, scratch resistance of the antireflection film) can be hardly enhanced due to small content of the polymerizable group.

In synthesizing the compound represented by formula (2), one vinyl polymerizable group-containing organosilane selected from (M-1) and (M-2) and one vinyl polymerizable group-free organosilane selected from (M-19) to (M-21) and (M-48) are preferably used in combination each in the above-described amount.

[Hydrolysate of Organosilane Compound and Partial Condensate Thereof]

At least either the hydrolysate of organosilane or the partial condensate thereof (sometimes referred to as a "sol component") preferably used in the present invention is preferably reduced in the volatility so as to stabilize the performance of the coated product. Specifically, the volatilization volume per hour at 105° C. is preferably 5 mass % or less, more preferably 3 mass % or less, still more preferably 1 mass % or less.

The sol component preferably used in the present invention is prepared by the hydrolysis of the above-described organosilane and/or the partial condensation of the hydrolysate. The hydrolysis and condensation reaction is performed by adding water in an amount of 0.05 to 2.0 mol, preferably from 0.1 to 1.0 mol, per mol of the hydrolyzable group ($X^{11}$) and stirring the resulting solution at 25 to 100° C. in the presence of a catalyst for use in the present invention.

In at least either the hydrolysate of organosilane or the partial condensate thereof preferably used in the present invention, either the hydrolysate of the vinyl polymerizable group-containing organosilane or the partial condensate thereof preferably has a weight average molecular weight of 450 to 20,000, more preferably from 500 to 10,000, still more preferably from 550 to 5,000, yet still more preferably from 600 to 3,000, excluding the components having a molecular weight of less than 300.

Out of the components having a molecular weight of 300 or more in the hydrolysate of organosilane and/or the partial condensate thereof, the content of the components having a molecular weight of more than 20,000 is preferably 10 mass % or less, more preferably 5 mass % or less, still more preferably 3 mass % or less. When the content of these components is 10 mass % or less, the cured film obtained by curing a curable composition containing such a hydrolysate of organosilane and/or a partial condensate thereof is excellent in the transparency or adhesion to the substrate and this is preferred.

Here, the weight average molecular weight and the molecular weight are a molecular weight determined by the differential refractometer detection with tetrahydrofuran (THF) as a solvent in a GPC analyzer using a column of TSKgel GmHxL, TSKgel G4000HxL or TSKgel G2000HxL {(trade names) all produced by Tosoh Corp.} and expressed in terms of polystyrene. The content is an area % of the peaks in the above-described molecular weight range, assuming that the peak area of the components having a molecular weight of 300 or more is 100%.

The dispersity (weight average molecular weight/number average molecular weight) is preferably from 3.0 to 1.1, more preferably from 2.5 to 1.1, still more preferably from 2.0 to 1.1, yet still more preferably from 1.5 to 1.1.

The state of $X^{11}$ in formula (1) being condensed in the form of —OSi can be confirmed by the $^{29}$Si-NMR analysis of the hydrolysate of organosilane or the partial condensate thereof preferably used in the present invention. At this time, assuming that the case where three bonds of Si are condensed in the form of —OSi is ($T_3$), the case where two bonds of Si are condensed in the form of —OSi is ($T_2$), the case where one bond of Si is condensed in the form of —OSi is ($T_1$) and the case where Si is not condensed at all is ($T_0$), the condensation rate α is represented by the following mathematical formula (2):

$$\alpha = (1/3)(T_3 \times 3 + T_2 \times 2 + T_1 \times 1)/(T_3+T_2+T_1+T_0) \quad \text{Mathematical Formula (2)}$$

The condensation rate α is preferably from 0.2 to 0.95, more preferably from 0.3 to 0.93, still more preferably from 0.4 to 0.9. When the condensation rate α is 0.1 or more, the hydrolysis or condensation proceeds satisfactorily to decrease the monomer component and sufficient curing results, and when it is 0.95 or less, there is not caused such a problem that the hydrolysis or condensation excessively proceeds and the hydrolyzable group is consumed out, and this is advantageous ill that the interaction of binder polymer, resin substrate, inorganic fine particle and the like is enhanced and the effect obtainable by their use is sufficiently exerted.

The hydrolysate of the organosilane compound and the partial condensate thereof preferably used in the present invention are described in detail below.

(Catalyst)

The hydrolysis reaction of organosilane and the subsequent condensation reaction are generally performed in the presence of a catalyst. Examples of the catalyst include inorganic acids such as hydrochloric acid, sulfuric acid and nitric acid; organic acids such as oxalic acid, acetic acid, butyric acid, maleic acid, citric acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxy aluminum, tetrabutoxy zirconium, tetrabutyl titanate and dibutyltin dilaurate; metal chelate compounds with the center metal being a metal such as Zr, Ti or Al; and fluorine-containing compounds such as $KF$ and $NH_4F$.

One of these catalysts may be used alone, or a plurality of species thereof may be used in combination.

(Solvent)

The hydrolysis and condensation reaction of organosilane may be performed without a solvent or in a solvent, but in order to uniformly mix the components, an organic solvent is preferably used. Suitable examples thereof include alcohols, aromatic hydrocarbons, ethers, ketones and esters. The solvent is preferably a solvent capable of dissolving the organosilane and the catalyst. In view of the process, the organic solvent is preferably used as a part of the coating solution. The solvent is also preferably a solvent which does not impair the solubility or dispersibility when mixed with other materials such as fluorine-containing copolymer.

Examples of the alcohols include a monohydric alcohol and a dihydric alcohol. The monohydric alcohol is preferably a saturated aliphatic alcohol having a carbon number of 1 to 8. Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol monoethyl ether acetate.

Specific examples of the aromatic hydrocarbons include benzene, toluene and xylene; specific examples of the ethers include tetrahydrofuran and dioxane; specific examples of the ketones include acetone, methyl ethyl ketone, methyl isobutyl ketone, diisobutyl ketone and cyclohexanone; and specific examples of the esters include ethyl acetate, propyl acetate, butyl acetate and propylene carbonate.

One of these organic solvents may be used alone, or two or more kinds thereof may be mixed and used. The concentration of solid contents in the reaction is not particularly limited but is usually from 1 to 100 mass %.

The hydrolysis.condensation reaction of organosilane is performed by adding water in an amount of 0.05 to 2 mol, preferably from 0.1 to 1 mol, per mol of the hydrolyzable group of organosilane, and stirring the resulting solution at 25 to 100° C. in the presence or absence of the above-described solvent and in the presence of the catalyst.

(Metal Chelate Compound)

In the present invention, the hydrolysis is preferably performed by stirring the solution at 25 to 100° C. in the presence of at least one metal chelate compound where an alcohol represented by the following formula (3-1) and a compound represented by the following formula (3-2) are present as ligands and the center metal is a metal selected from Zr; Ti and Al.

$R^{31}OH$   Formula (3-1)

$R^{32}COCH_2COR^{33}$   Formula (3-2)

(wherein $R^{31}$ represents an alkyl group having a carbon number of 1 to 10, $R^{32}$ represents an alkyl group having a carbon number of 1 to 10, and $R^{33}$ represents an alkyl group having a carbon number of 1 to 10 or an alkoxy group having a carbon number of 1 to 10).

In the case of using a fluorine-containing compound as the catalyst, the fluorine-containing compound has an ability of allowing the progress of complete hydrolysis and condensation and this is advantageous in that the polymerization degree can be determined by selecting the amount of water added and an arbitrary molecular weight can be designed. That is, in order to prepare an organosilane hydrolysate/partial condensate having an average polymerization degree of M, this may be attained by using water in an amount of (M-1) mol per M mol of the hydrolyzable organosilane.

Any metal chelate compound may be suitably used without particular limitation as long as it is a metal chelate compound where an alcohol represented by formula (3-1) and a compound represented by formula (3-2) are present as ligands and the center metal is a metal selected from Zr, Ti and Al. Within this category, two or more kinds of metal chelate compounds may be used in combination.

The metal chelate compound for use in the present invention is preferably selected from the group consisting of compounds represented by the following formulae (3-3) to (3-5), and these compounds have an activity of accelerating the condensation reaction of the hydrolysate of the organosilane compound and the partial condensate thereof.

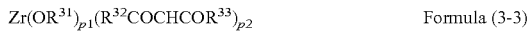

$Zr(OR^{31})_{p1}(R^{32}COCHCOR^{33})_{p2}$   Formula (3-3)

$Ti(OR^{31})_{q1}(R^{32}COCHCOR^{33})_{q2}$   Formula (3-4)

$Al(OR^{31})_{r1}(R^{32}COCHCOR^{33})_{r2}$   Formula (3-5)

In the formulae of metal chelate compounds, $R^{31}$ and $R^{32}$ may be the same or different and each represents an alkyl group having a carbon number of 1 to 10, specifically, an ethyl group, an n-propyl group, an i-propyl group, an n-butyl group, an sec-butyl group, a tert-butyl group or an n-pentyl group. $R^{33}$ represents an alkyl group having a carbon number of 1 to 10 the same as above or an alkoxy group having a carbon number of 1 to 10, such as methoxy group, ethoxy group, n-propoxy group, i-propoxy group n-butoxy group, sec-butoxy group or tert-butoxy group. In the metal chelate compounds, p1, p2, q1, q2, r1 and r2 each represents an integer determined to satisfy the relationships of p1+p2=4, q1+q2=4 and r1+r2=3.

Specific examples of the metal chelate compound include a zirconium chelate compound such as zirconium tri-n-butoxyethylacetoacetate, zirconium di-n-butoxybis(ethylacetoacetate), zirconium n-butoxytris(ethylacetoacetate), zirconium tetrakis(n-propylacetoacetate), zirconium tetrakis(acetylacetoacetate) and zirconium tetrakis(ethylacetoacetate); a titanium chelate compound such as titanium diisopropoxy.bis(ethylacetoacetate), titanium diisopropoxy.bis(acetylacetate) and titanium diisopropoxy.bis(acetylacetone); and an aluminum chelate compound such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris(acetylacetonate) and aluminum monoacetylacetonate.bis(ethylacetoacetate).

Among these metal chelate compounds, preferred are zirconium tri-n-butoxyethylacetoacetate, titanium diisopropoxybis(acetylacetonate), aluminum diisopropoxyethylacetoacetate and aluminum tris(ethylacetoacetate). One of these meal chelate compounds may be used alone, or two or more kinds thereof may be mixed and used. A partial hydrolysate of such a metal chelate compound may also be used.

The metal chelate compound is preferably used in a proportion of 0.01 to 50 mass %, more preferably from 0.1 to 50 mass %, still more preferably from 0.5 to 10 mass %, based on the organosilane compound. When the metal chelate compound is used in this range, the condensation reaction of the organosilane compound proceeds at a high rate, the film coating can have good durability, and the composition comprising the hydrolysate of the organosilane compound, the partial condensate thereof and the metal chelate compound is assured of good storage stability.

(β-Diketone Compound and β-Ketoester Compound)

In the coating solution for use in the present invention, at least either a β-diketone compound or a β-ketoester compound is preferably added in addition to the composition containing the above-described sol component and metal chelate compound. This is described below.

The compound used in the present invention is at least either a β-diketone compound or a β-ketoester compound, represented by the formula: $R^{32}COCH_2COR^{33}$, and this compound functions as a stability enhancer for the composition for use in the present invention. That is, this compound is considered to coordinate to a metal atom in the metal chelate compound (at lease any one compound of zirconium, titanium and aluminum compounds) and inhibit the metal chelate compound from exerting the activity of accelerating the condensation reaction of the hydrolysate of the organosilane compound and its partial condensate, thereby acting to enhance the storage stability of the composition obtained. $R^{32}$ and $R^{33}$ constituting the β-diketone compound and β-ketoester compound have the same meanings as $R^{32}$ and $R^{33}$ constituting the metal chelate compound above.

Specific examples of the β-diketone compound and β-ketoester compound include acetylacetone, methyl acetoacetate, ethyl acetoacetate, n-propyl acetoacetate i-propyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione and 5-methylhexanedione. Among these, ethyl acetoacetate and acetylacetone are preferred, and acetylacetone is more preferred.

One of these β-diketone compounds and β-ketoester compounds may be used alone, or two or more kinds thereof may be mixed and used. In the present invention, the β-diketone compound and the β-ketoester compound each is preferably used in an amount of 2 mol or more, more preferably from 3 to 20 mol, per mol of the metal chelate compound. By using the compound in an amount of 2 mol or more, the storage stability of the composition obtained can be improved and this is preferred.

The content of the hydrolysate of the organosilane compound or the partial condensate thereof is preferably small in the case of the low refractive index layer which is a relatively thin film, and preferably large in the case of the antiglare layer which is a thick film. Considering the expression of effect, refractive index, shape/surface state of film and the like, the content is preferably from 0.1 to 50 mass %, more preferably from 0.5 to 30 mass %, and most preferably from 1 to 15 mass %, based on the entire solid content of the layer containing the hydrolysate or its partial condensate (the layer to which the hydrolysate or its partial condensate is added).

In the case of using the hydrolysate of the vinyl polymerizable group-containing organosilane compound and/or the partial condensate thereof, a photolyzable initiator is preferably used in combination. Examples of the skeleton of such an initiator include the compounds exemplified in the paragraphs of polymerization initiator described below.

[Polymerization Initiator]
(Photopolymerization Initiator)

Examples of the photoradical polymerization initiator include acetophenones, benzoins, benzophenones, phosphine oxides, ketals, anthraquinones, thioxanthones, azo compounds, peroxides (see, for example, JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxydimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether. Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the borate salts include organoborate salt compounds described in Japanese Patent 2764769, JP-A-2002-116539, and Kunz, Martin, et al., *Rad Tech '98, Proceeding April*, pages 19-22 (1998, Chicago). More specifically, examples thereof include compounds described in paragraphs [0022] to [0027] of JP-A-2002-116539, supra. Other examples of the organoboron compound include organoboron transition metal coordination complexes described in JP-A-6-348011, JP-A-7-128785, JP-A-7-140589, JP-A-7-

306527 and JP-A-7-292014, and specific examples thereof include ion complexes with a cationic coloring matter.

Examples of the phosphine oxides include 2,4,6-trimethylbenzoyldiphenylphosphine oxide. Examples of the active esters include 1,2-octanedione, 1-[4-(phenylthio)-2-(O-benzoyloxime)], sulfonic acid esters and cyclic active ester compounds. Specifically, Compounds 1 to 21 described in Examples of JP-A-2000-80068 are preferred. Examples of the onium salts include an aromatic diazonium salt, an aromatic iodonium salt and an aromatic sulfonium salt.

Specific examples of the active halogens include compounds described in Wakabayashi et al., *Bull Chem. Soc. Japan*, Vol. 42, page 2924 (1969), U.S. Pat. No. 3,905,815, JP-A-5-27830, and M. P. Hutt, *Journal of Heterocyclic Chemistry*, Vol. 1 (No. 3) (1970), particularly a trihalomethyl group-substituted oxazole compound and an s-triazine compound. Among these, preferred is an s-triazine derivative where at least one mono-, di- or tri-halogen-substituted methyl group is bonded to the s-triazine ring. Specifically, S-triazine and oxathiazole compounds are known, and examples thereof include 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine and 2-trihalomethyl-5-(p-methoxyphenyl)-1,3,4-oxadiazole.

Specific preferred examples thereof include compounds described at pp. 14-30 of JP-A-58-15503 and pp. 6-10 of JP-A-55-77742, Compound Nos. 1 to 8 described at page 287 of JP-B-60-27673 (the term "JP-B" as used herein means an "examined Japanese patent publication"), Compound Nos. 1 to 17 described at pp. 443-444 of JP-A-60-239736, and Compound Nos. 1 to 19 described in U.S. Pat. No. 4,701,399.

Specific examples of the active halogens are set forth below.

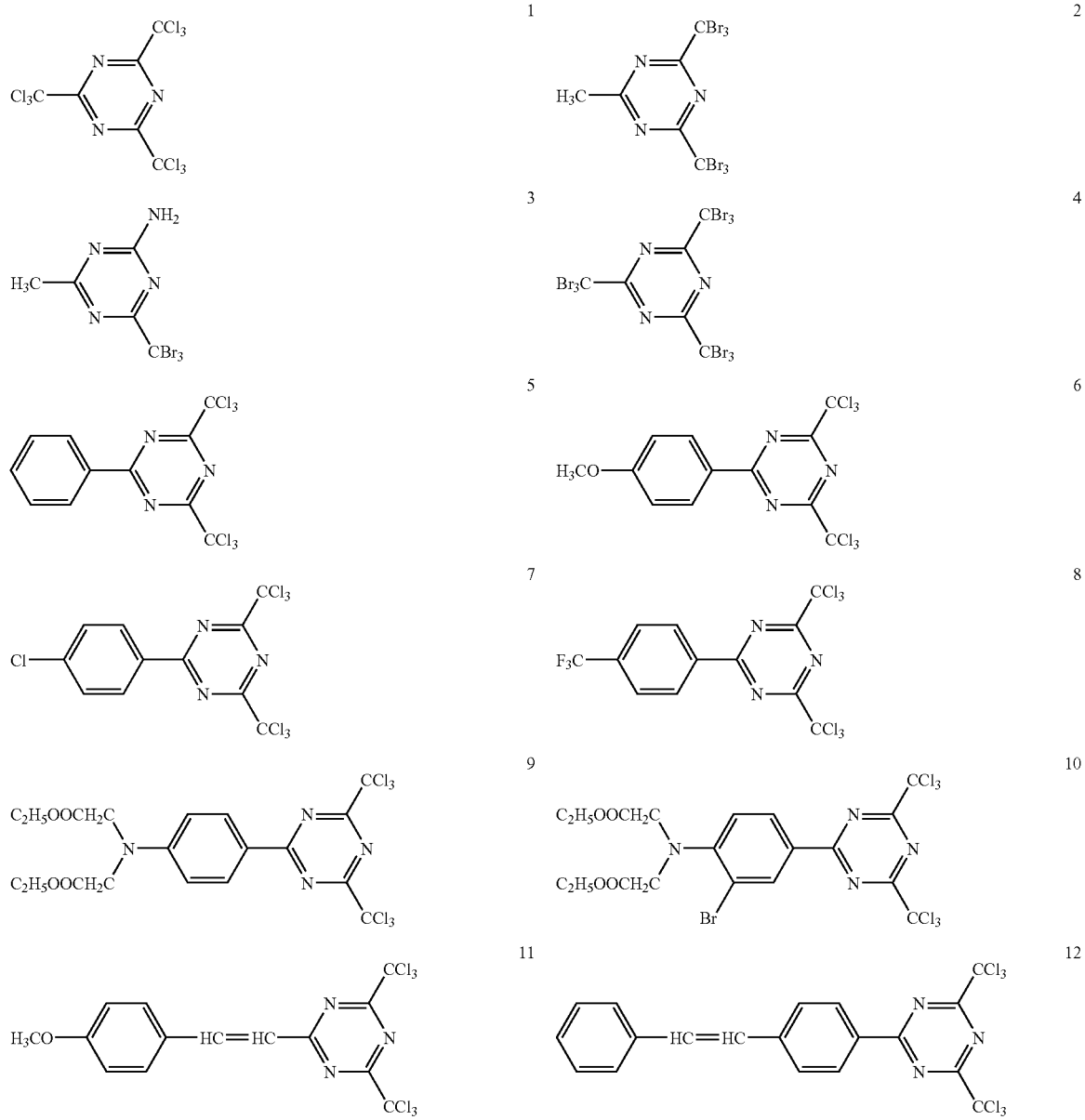

-continued
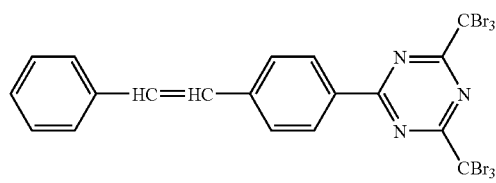
13
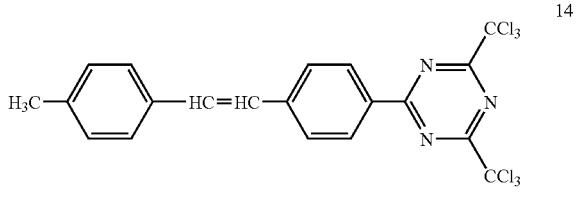
14
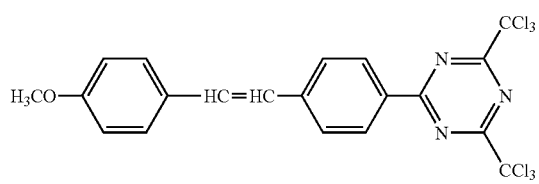
15
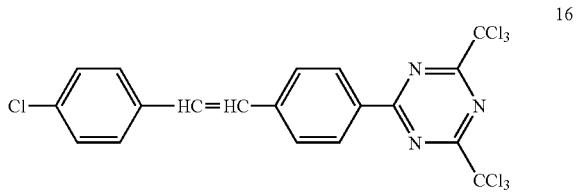
16
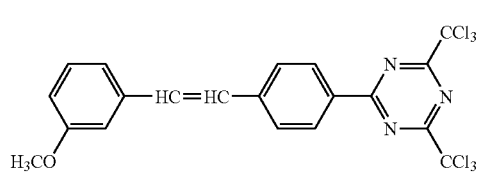
17
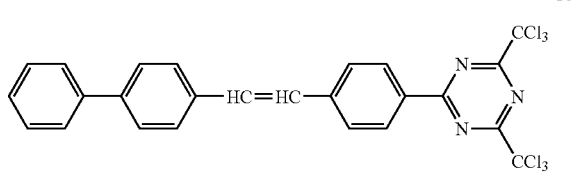
18
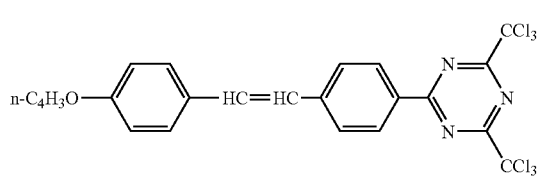
19
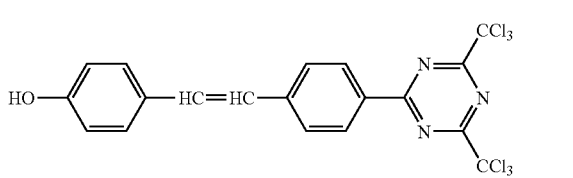
20
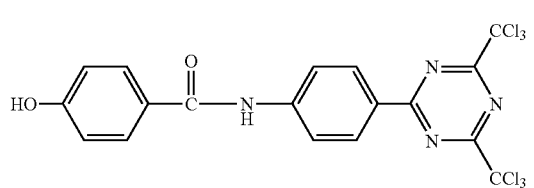
21
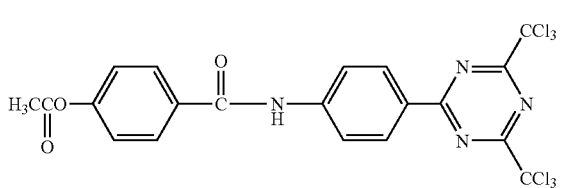
22
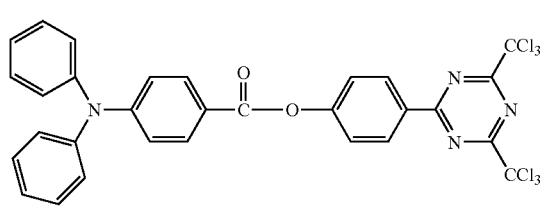
24
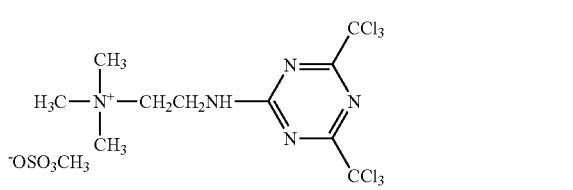
24-1
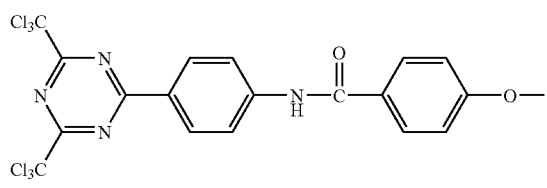
24-2
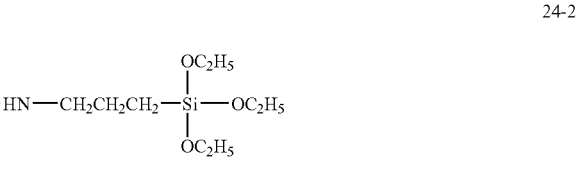
24-3
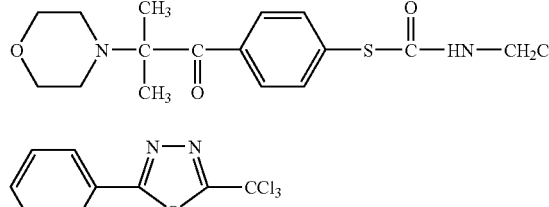
25
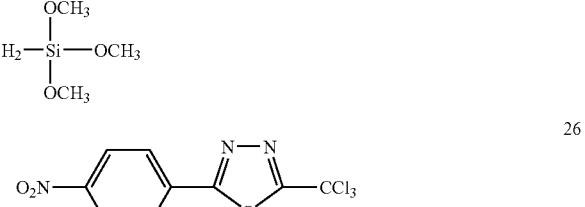
26

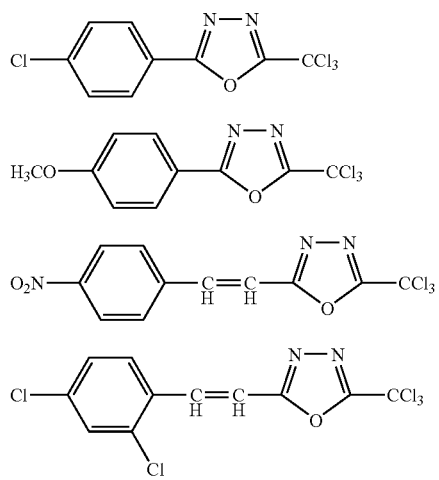

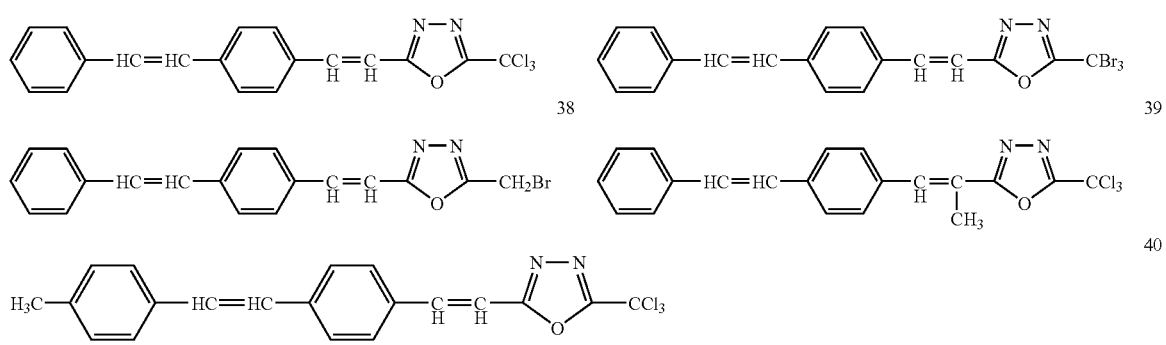

Examples of the inorganic complexes as the photoradical polymerization initiator include bis-(η⁵-2,4-cyclopentadien-1-yl)-bis(2,6-difluoro-3-(1H-pyrrol-1-yl)-phenyl)titanium. Examples of the coumarins include 3-ketocoumarin.

These initiators may be used individually or as a mixture.

Various examples are also described in *Saishin UV Koka Gijutsu* (*Newest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), and these are useful in the present invention.

Preferred examples of the commercially available photoradical polymerization initiator include "KAYACURE (e.g., DETX-S, BP-100, BDMK, CTX, BMS, 2-EAQ, ABQ, CPTX, EPD, ITX, QTX, BTC, MCA)" produced by Nippon Kayaku Co., Ltd.; "Irgacure (e.g., 651, 184, 500, 819, 907, 127, 369, 1173, 1870, 2959, 4265, 4263)" produced by Ciba Specialty Chemicals Corp.; "Esacure (KIP100F, KB1, EB3, BP, X33, KT046, KT37, KIP150, TZT)" produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

(Photosensitizer)

In addition to the photopolymerization initiator, a photosensitizer may be used. Specific examples of the photosensitizer include n-butylamine, triethylamine, tri-n-butylphosphine, Michler's ketone and thioxanthone.

Furthermore, one or more auxiliary agents such as azide compound, thiourea compound and mercapto compound may be used in combination.

Examples of the commercially available photosensitizer include "KAYACURE (DMBI, EPA)" produced by Nippon Kayaku Co., Ltd.

(Thermal Initiator)

As for the thermal radical initiator, an organic or inorganic peroxide, an organic azo or diazo compound, and the like may be used. More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

[Crosslinking Agent (Crosslinking Compound)]

In the case where the monomer or polymer binder constituting the antiglare layer and low refractive index layer of the present invention lacks satisfactory curability by itself, the necessary curability can be imparted by blending a crosslinking compound. Particularly, it is effective to incorporate a crosslinking compound into the low refractive index layer. For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a glycoluril-based compound.

The melamine-based compound is generally known as a compound having a skeleton of a nitrogen atom being bonded to the triazine ring, and specific examples thereof include melamine, alkylated melamine, methylol melamine and alkoxylated methyl melamine. A compound having two or more groups in total of either one or both of a methylol group and an alkoxylated methyl group within one molecule is preferred.

Specifically, a methylolated melamine obtained by reacting melamine and formaldehyde under basic conditions, an alkoxylated methyl melamine, and a derivative thereof are preferred, and an alkoxylated methyl melamine is more preferred because good storage stability of the curable resin composition and good reactivity are obtained. The methylolated melamine and alkoxylated methyl melamine used as the crosslinking compound are not particularly limited, and various resinous materials obtained by the method described, for example, in *Plastic Zairvo Koza (Plastic Material Course)* [8] *Urea-Melamine Jushi (Urea-Melamine Resin)*, Nikkan Kogyo Shinbun-Sha, can also be used.

Examples of the urea-based compound include, in addition to urea, a polymethylolated urea and its derivative such as alkoxylated methylurea and urone ring-containing methylolated urone or alkoxylated methylurone. Also as for the compound such as urea derivative, various resinous materials described in the publication above can be used.

(Curing Catalyst)

In the film of the present invention, a curing catalyst capable of generating a radical or an acid upon irradiation with ionizing radiation or heat can be used as the curing catalyst for accelerating the curing.

(Thermal Acid Generator)

As one example of the antiglare film of the present invention, the film can be cured by heating and thereby causing a crosslinking reaction between the hydroxyl group of the fluorine-containing copolymer and a curing agent capable of crosslinking with the hydroxyl group. In this system, the curing is accelerated by an acid and therefore, an acidic substance is preferably added to the curable resin composition. However, if a normal acid is added, the crosslinking reaction proceeds even in the coating solution and this may give rise to a failure (e.g., unevenness, repelling). Accordingly, in order to satisfy both the storage stability and the curing activity in the thermal curing system, a compound capable of generating an acid under heating is more preferably added as the curing catalyst.

The curing catalyst is preferably a salt comprising an acid and an organic base. Examples of the acid include an organic acid such as sulfonic acid, phosphonic acid and carboxylic acid, and an inorganic acid such as sulfonic acid and phosphoric acid. In view of compatibility with the polymer, an organic acid is more preferred, a sulfonic acid and a phosphonic acid are still more preferred, and a sulfonic acid is most preferred. Preferred examples of the sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MSOH) and nonafluorobutane-1-sulfonic acid (NFBS), and these all can be preferably used (abbreviations are shown in parentheses).

The curing catalyst greatly varies depending on the basicity and boiling point of the organic base combined with the acid. The curing catalysts preferably used in the present invention from respective standpoints are described below.

As the basicity of the organic base combined with the acid in the curing catalyst is lower, the acid generation efficiency at the heating is higher and this is preferred in view of curing activity, but if the basicity is too low, the storage stability becomes insufficient. Accordingly, an organic base having appropriate basicity is preferably used. When pKa of the conjugated acid is used as an index indicative of basicity, the pKa of the organic base for use in the present invention is preferably from 5.0 to 11.0, more preferably from 6.0 to 10.5, still more preferably from 6.5 to 10.0.

As for the pKa value of the organic base, the values in an aqueous solution are described in *Kagaku Binran, Kiso-Hen (Chemical Handbook. Basic Edition)*, 5th rev., Vol. 2, pp. II-334 to 340, compiled by The Chemical Society of Japan, Maruzene (2004), and an organic base having an appropriate pKa can be selected therefrom. Even when not described in this publication, a compound estimated to have an appropriate pKa from its structure can also be preferably used. Compounds having an appropriate pKa described in the publication above are shown in Table 2 below, but the compounds which can be preferably used in the present invention are not limited thereto.

TABLE 2

| | | pKa |
|---|---|---|
| b-1 | N,N-dimethylaniline | 5.1 |
| b-2 | benzimidazole | 5.5 |
| b-3 | pyridine | 5.7 |
| b-4 | 3-methylpyridine | 5.8 |
| b-5 | 2,9-dimethyl-1,10-phenanthroline | 5.9 |
| b-6 | 4,7-dimethyl-1,10-phenanthroline | 5.9 |
| b-7 | 2-methylpyridine | 6.1 |
| b-8 | 4-methylpyridine | 6.1 |
| b-9 | 3-(N,N-dimethylamino)pyridine | 6.5 |
| b-10 | 2,6-dimethylpyridine | 7.0 |
| b-11 | imidazole | 7.0 |
| b-12 | 2-methylimidazole | 7.6 |
| b-13 | N-ethylmorpholine | 7.7 |
| b-14 | N-methylmorpholine | 7.8 |
| b-15 | bis(2-methoxyethyl)amine | 8.9 |
| b-16 | 2,2'-iminodiethanol | 9.1 |
| b-17 | N,N-dimethyl-2-aminoethanol | 9.5 |
| b-18 | trimethylamine | 9.9 |
| b-19 | triethylamine | 10.7 |

As the boiling point of the organic base is lower, the acid generation efficiency at the heating is higher and this is preferred in view of curing activity. Accordingly, an organic base having an appropriate boiling point is preferably used. The boiling point of the base is preferably 120° C. or less, more preferably 80° C. or less, still more preferably 70° C. or less.

Examples of the organic base which can be preferably used in the present invention include, but are not limited to, the following compounds. The boiling points are shown in parentheses.

b-3: pyridine (115° C.)
b-14: N-methylmorpholine (115° C.)
b-20: diallylmethylamine (111° C.)
b-19: triethylamine (88.8° C.)
b-21: tert-butylmethylamine (67 to 69° C.)
b-22: dimethylisopropylamine (66° C.)
b-23: diethylmethylamine (63 to 65° C.)
b-24: dimethylethylamine (36 to 38° C.)
b-18: trimethylamine (3 to 5° C.)

In use as the acid catalyst, a salt comprising the acid and the organic base may be isolated and used or after mixing the acid and the organic base to form a salt in a solution, the solution may be used. For both the acid and the organic base, one species may be used alone or a plurality of species may be mixed and used. In mixing the acid and the organic base, these are preferably mixed such that the equivalent ratio of the acid and the organic base becomes 1:0.9 to 1.5, more preferably 1:0.95 to 1.3, still more preferably 1:1.0 to 1.1.

Examples of the material commercially available as the thermal acid generator include "Catalyst 4040", "Catalyst 4050", "Catalyst 600", "Catalyst 602". "Catalyst 500" and "Catalyst 296-9" {all produced by Nihon Cytec Industries Inc.}; "NACURE series 155, 1051, 5076 and 4054J" and, as the block type thereof; "NACURE series 2500, 5225, X49-110, 3525 and 4167" (all produced by King Industries.)

The proportion of the thermal acid generator used is preferably from 0.01 to 10 parts by mass, more preferably from 0.1 to 5 parts by mass, still more preferably from 0.2 to 3 parts by mass, per 100 parts by mass of the curable resin composition. When the amount added is in this range, good storage stability of the curable resin composition and good scratch resistance of the film coating are ensured.

{Photosensitive Acid Generator (Photoacid Generator)}

The photoacid generator which can be further used as the photopolymerization initiator is described in detail below.

Examples of the acid generator include known compounds such as photoinitiator for photocationic polymerization, photo-decoloring agent for coloring matters, photo-discoloring agent and known acid generator used for microresist or the like, and a mixture thereof. Furthermore, the acid generator include, for example, an organic halogenated compound, a disulfone compound and an onium compound. Of these, specific examples of the organohalogen compound and the disulfone compound are the same as those described above for the compound capable of generating a radical.

The photosensitive acid generator includes, for example, (1) various onium salts such as iodonium salt, sulfonium salt, phosphonium salt, diazonium salt, ammonium salt and pyridinium salt; (2) sulfone compounds such as $\beta$-ketoester, $\beta$-sulfonylsulfone and their $\alpha$-diazo compound; (3) sulfonic acid esters such as alkylsulfonic acid ester, haloalkylsulfonic acid ester, arylsulfonic acid ester and imino sulfonate; (4) sulfonimide compounds; and (5) diazomethane compounds.

Examples of the onium compound include a diazonium salt, an ammonium salt, an iminium salt, a phosphonium salt, an iodonium salt, a sulfonium salt, an arsonium salt and a selenonium salt. Among these, a diazonium salt, an iodonium salt, a sulfonium salt and an iminium salt are preferred in view of photosensitivity for the initiation of photopolymerization, material stability of the compound, and the like. Examples thereof include compounds described in paragraphs [0058] and [0059] of JP-A-2002-29162.

The proportion of the photosensitive acid generator used is preferably from 0.01 to 10 parts by mass, more preferably from 0.1 to 5 parts by mass, per 100 parts by mass of the curable resin composition.

As for other specific compounds and use methods, those described, for example, in JP-A-2005-43876 can be used.

(Formation of Low Refractive Index Layer)

In the antiglare film of the present invention, the low refractive index layer can be formed by coating, and the coating solution for forming the low refractive index layer preferably contains, as the film-forming component, at least one kind of a light-transparent resin having an ultraviolet (UV)-curable and/or heat-curable functional group {the light-transparent resin having a ultraviolet (UV)-curable and/or heat-curable functional group is preferably, for example, the fluorine-containing copolymer or organosilane compound described above}.

Also, in the antiglare film of the present invention, preferably, the coating solution for forming the low refractive index layer contains at least two or more kinds of light-transparent resins as the film-forming component, with at least one kind of the light-transparent resin having an ultraviolet (UV)-curable functional group and at least one different kind of the light-transparent resin having a heat-curable functional group; more preferably, the coating solution for forming the low refractive index layer additionally contains at least one kind of a polymerization initiator and at least one kind of a heat-curable crosslinking agent; and still more preferably, the low refractive index layer additionally contains a curing catalyst capable of accelerating the thermal curing (as for the polymerization initiator, heat-curable crosslinking agent and curing catalyst capable of accelerating the thermal curing, those described above can be preferably used).

The value obtained by dividing the total weight of a light-transparent resin having at least an ultraviolet (UV)-curable functional group and at least one kind of a polymerization initiator contained in the coating solution for forming the low refractive index layer, by the total weight of at least one kind of a light-transparent resin having a heat-curable functional group and at least one kind of a heat-curable crosslinking agent is preferably from 0.05 to 0.19 in view of the scratch resistance and cost, more preferably from 0.10 to 0.19, still more preferably from 0.15 to 0.19. When this numerical value is 0.05 or more, good scratch resistance is obtained and this is preferred, and when the value is 0.20 or less, the UV curing component comes to occupy an appropriate proportion and this advantageously allows for appropriate processing conditions (for example, nitrogen purging at UV curing or elevation of film surface temperature) for increasing the polymerization efficiency at UV curing.

The oxygen concentration adjusted by nitrogen purging at UV curing is preferably 1,000 ppm or less, more preferably 500 ppm or less, still more preferably 100 ppm or less, and most preferably 50 ppm or less. The film surface temperature at UV curing is preferably 50° C. or more, more preferably 70° C. or more, still more preferably 90° C. or more. When this temperature is not more than the upper limit above, there is not caused such a problem that the support is softened and a handling (transport) failure occurs, and therefore, the upper limit of the temperature is preferably decided in this range.

[Leveling Agent]

For the purpose of improving the surface state (preventing unevenness), various leveling agents are preferably used in at least one antiglare layer of the present invention. Similarly, for the purpose of preventing unevenness, various leveling agents are preferably used in the low refractive index layer of the present invention.

Specifically, the leveling agent is preferably a fluorine-based leveling agent or a silicone-based leveling agent. In particular, a combination use of both a fluorine-based leveling agent and a silicone-based leveling agent is more preferred, because high ability of preventing unevenness is obtained. It is still more preferred to use a leveling agent in all layers. Also, the leveling agent is preferably an oligomer or a polymer rather than a low molecular compound.

When a leveling agent is added, the leveling agent swiftly undergoes uneven distribution to the surface of the coated liquid film and the leveling agent remains unevenly distributed to the surface even after drying, as a result, the surface energy of the antiglare layer or low refractive index layer to which the leveling agent is added, decreases due to the leveling agent. From the standpoint of preventing unevenness of the antiglare layer, the surface energy of the antiglare layer is preferably low.

The surface energy ($\gamma s^v$, unit: $mJ/m^2$) of the antiglare layer can be experimentally determined using pure water $H_2O$ and methylene iodide $CH_2I_2$ on the antiglare layer by referring to D. K. Owens, *J. Appl. Polym. Sci.*, 13, page 1741 (1969). At this time, assuming that the contact angles for pure water and methylene iodide are $\theta_{H2O}$ and $\theta_{CH2I2}$, respectively, $\gamma s^d$ and $\gamma s^h$ are determined according to the following simultaneous equations (1) and (2), and the surface energy is expressed by the sum thereof, that is, a value $\gamma s^v$ (=$\gamma s^d$+$\gamma s^h$), and defined as the energy-reduced surface tension value (a value obtained by converting the mN/m unit into the mJ/m² unit) of the antiglare layer. Before the measurement, the sample needs to be subjected to humidity conditioning under predetermined temperature and humidity conditions for a fixed time or more. Here, the temperature is preferably from 20 to 27° C., the humidity is preferably from 50 to 65 RH %, and the humidity conditioning time is preferably 2 hours or more.

$$1+\cos\theta_{H2O}=2\sqrt{\gamma s^d}(\sqrt{\gamma_{H2O}^d}/\gamma_{H2O}^v)+2\sqrt{\gamma s^h}(\sqrt{\gamma_{H2O}^h}/\gamma_{H2O}^v) \quad (1)$$

$$1+\cos\theta_{CH2I2}=2\sqrt{\gamma s^d}(\sqrt{\gamma_{CH2I2}^d}/\gamma_{CH2I2}^v)+2\sqrt{\gamma s^h}(\sqrt{\gamma_{CH2I2}^h}/\gamma_{CH2I2}^v) \quad (2)$$

wherein $\gamma_{H2O}^d$=21.8°, $\gamma_{H2O}^h$=51.0°, $\gamma_{H2O}^v$=72.8°, $\gamma_{CH2I2}^d$=49.5°, $\gamma_{CH2I2}^h$=1.3° and $\gamma_{CH2I2}^v$=50.8°.

The surface energy of the antiglare layer is preferably 45 mJ/m² or less, more preferably from 20 to 45 mJ/m², still more preferably from 20 to 40 mJ/m². By setting the surface energy of the antiglare layer to 45 mJ/m² or less, an effect of hardly causing unevenness of the antiglare layer is obtained. However, in the case of further coating an upper layer such as low refractive index layer on the antiglare layer, the leveling agent preferably dissolves out and migrates into the upper layer. The surface energy of the antiglare layer after immersing the antiglare layer with the solvent (e.g., methyl ethyl ketone, methyl isobutyl ketone, toluene, cyclohexanone) of the coating solution for the upper layer on the antiglare layer and washing it out is preferably rather high. The surface energy here is preferably from 35 to 70 mJ/m².

The fluorine-based leveling agent preferred as the leveling agent for the antiglare layer is described below. The silicone-based leveling agent is described later.

(Fluorine-Based Leveling Agent)

The fluorine-based leveling agent is preferably a polymer having a fluoroaliphatic group. Furthermore, the useful polymer is a polymer comprising a repeating unit (polymerization unit) corresponding to the monomer of (i) below, or a copolymer of an acrylic or methacrylic resin comprising a repeating unit (polymerization unit) corresponding to the monomer of (i) below and a repeating unit (polymerization unit) corresponding to the monomer of (ii) below, with a vinyl-based monomer copolymerizable therewith. As for such a monomer, those described in J. Brandrup, *Polymer Handbook*, 2nd ed., Chapter 2, pp. 1-483, Wiley Interscience (1975) may be used. Examples thereof include compounds having one addition-polymerizable unsaturated bond selected from an acrylic acid, a methacrylic acid, acrylic acid esters, methacrylic acid esters, acrylamides, methacrylamides, allyl compounds, vinyl ethers and vinyl esters.

(i) Fluoroaliphatic group-containing monomer represented by the following formula (4-1)

Formula (4-1):

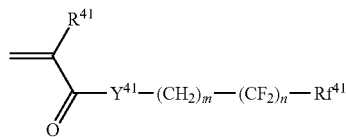

In formula (4-1), $R^{41}$ represents a hydrogen atom, a halogen atom or a methyl group and is preferably a hydrogen atom or a methyl group. $Y^{41}$ represents an oxygen atom, a sulfur atom or —N($R^{42}$)— and is preferably an oxygen atom or —N($R^{42}$)—, more preferably an oxygen atom. $R^{42}$ represents a hydrogen atom or an alkyl group having a carbon number of 1 to 8 which may have a substituent, and is preferably a hydrogen atom or an alkyl group having a carbon number of 1 to 4, more preferably a hydrogen atom or a methyl group. $Rf^{41}$ represents —$CF_3$ or —$CF_2H$.

In formula (4-1), m represents an integer of 1 to 6 and is preferably an integer of 1 to 3, more preferably 1. n represents an integer of 1 to 11 and is preferably an integer of 1 to 9, more preferably from 1 to 6. $Rf^{41}$ is preferably —$CF_2H$.

Also, two or more kinds of polymerization units derived from the fluoroaliphatic group-containing monomer represented by formula (4-1) may be contained as constituent components in the fluoroaliphatic group-containing (co)polymer.

(ii) Monomer represented by the following formula (4-2), which is copolymerizable with (i)

Formula (4-2):

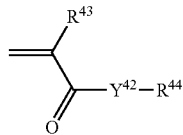

In formula (4-2), $R^{43}$ represents a hydrogen atom, a halogen atom or a methyl group and is preferably a hydrogen atom or a methyl group. $Y^{42}$ represents an oxygen atom, a sulfur atom or —N($R^{45}$)— and is preferably an oxygen atom or —N($R^{45}$)—, more preferably an oxygen atom. $R^{45}$ represents a hydrogen atom or an alkyl group having a carbon number of 1 to 8 and is preferably a hydrogen atom or an alkyl group having a carbon number of 1 to 4, more preferably a hydrogen atom or a methyl group. $R^{44}$ represents a linear, branched or cyclic alkyl group having a carbon number of 1 to 60 which may have a substituent, or an aromatic group (for example, a phenyl group or a naphthyl group) which may have a substituent. The alkyl group may contain a poly(alkyleneoxy) group. $R^{44}$ is preferably a linear, branched or cyclic alkyl group having a carbon number of 1 to 20, more preferably a linear or branched alkyl group having a carbon number of 1 to 10. The amount of the fluoroaliphatic group-containing monomer of formula (4-1) used for the production of the preferred fluoroaliphatic group-containing (co)polymer is 10 mass % or more, preferably 50 mass % or more, more preferably from 70 to 100 mass %, still more preferably from 80 to 100 mass %, based on the entire monomer amount of the copolymer.

Specific examples of the structure of the preferred fluoroaliphatic group-containing (co)polymer are set forth below, but the present invention is not limited thereto. In the formulae, the numeral indicates the molar ratio of respective monomer components, and Mw indicates the mass average molecular weight.

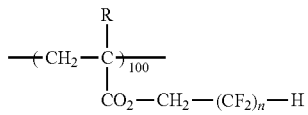

| | R | n | Mw |
|---|---|---|---|
| FP-1 | H | 4 | 8000 |
| FP-2 | H | 4 | 16000 |
| FP-3 | H | 4 | 33000 |
| FP-4 | CH$_3$ | 4 | 12000 |
| FP-5 | CH$_3$ | 4 | 28000 |
| FP-6 | H | 6 | 8000 |
| FP-7 | H | 6 | 14000 |
| FP-8 | H | 6 | 29000 |
| FP-9 | CH$_3$ | 6 | 10000 |
| FP-10 | CH$_3$ | 6 | 21000 |
| FP-11 | H | 8 | 4000 |
| FP-12 | H | 8 | 16000 |
| FP-13 | H | 8 | 31000 |
| FP-14 | CH$_3$ | 8 | 3000 |
| FP-15 | CH$_3$ | 8 | 10000 |
| FP-16 | CH$_3$ | 8 | 27000 |
| FP-17 | H | 10 | 5000 |
| FP-18 | H | 10 | 11000 |
| FP-19 | CH$_3$ | 10 | 4500 |
| FP-20 | CH$_3$ | 10 | 12000 |
| FP-21 | H | 12 | 5000 |
| FP-22 | H | 12 | 10000 |
| FP-23 | CH$_3$ | 12 | 5500 |
| FP-24 | CH$_3$ | 12 | 12000 |

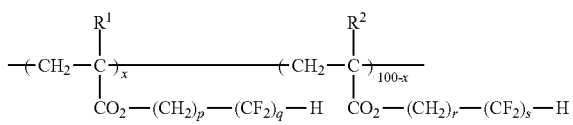

| | x | R$^1$ | p | q | R$^2$ | r | s | Mw |
|---|---|---|---|---|---|---|---|---|
| FP-25 | 50 | H | 1 | 4 | CH$_3$ | 1 | 4 | 10000 |
| FP-26 | 40 | H | 1 | 4 | H | 1 | 6 | 14000 |
| FP-27 | 60 | H | 1 | 4 | CH$_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | CH$_3$ | 1 | 8 | 8000 |
| FP-31 | 10 | CH$_3$ | 1 | 4 | CH$_3$ | 1 | 8 | 7000 |
| FP-32 | 50 | H | 1 | 6 | CH$_3$ | 1 | 6 | 12000 |
| FP-33 | 50 | H | 1 | 6 | CH$_3$ | 1 | 6 | 22000 |
| FP-34 | 30 | H | 1 | 6 | CH$_3$ | 1 | 6 | 5000 |
| FP-35 | 40 | CH$_3$ | 1 | 6 | H | 3 | 6 | 3000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | CH$_3$ | 1 | 6 | H | 3 | 8 | 19000 |
| FP-40 | 50 | H | 1 | 8 | CH$_3$ | 1 | 8 | 5000 |
| FP-41 | 80 | H | 1 | 8 | CH$_3$ | 1 | 8 | 10000 |
| FP-42 | 50 | CH$_3$ | 1 | 8 | H | 3 | 8 | 14000 |
| FP-43 | 90 | 11 | 1 | 8 | CH$_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | CH$_3$ | 3 | 12 | 8000 |

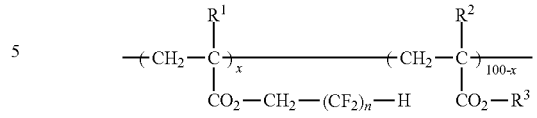

| | x | R$^1$ | n | R$^2$ | R$^3$ | Mw |
|---|---|---|---|---|---|---|
| FP-48 | 90 | H | 6 | H | C$_2$H$_5$ | 9000 |
| FP-49 | 80 | H | 6 | H | C$_2$H$_5$ | 24000 |
| FP-50 | 60 | H | 6 | H | C$_2$H$_5$ | 36000 |
| FP-51 | 90 | H | 6 | H | C$_4$H$_9$(n) | 15000 |
| FP-52 | 80 | H | 6 | H | C$_4$H$_9$(n) | 17000 |
| FP-53 | 60 | H | 6 | H | C$_4$H$_9$(n) | 10000 |
| FP-54 | 90 | H | 6 | H | C$_4$H$_9$(iso) | 16000 |
| FP-55 | 80 | H | 6 | H | C$_4$H$_9$(iso) | 18000 |
| FP-56 | 60 | H | 6 | H | C$_4$H$_9$(iso) | 21000 |
| FP-57 | 90 | H | 6 | H | C$_4$H$_9$(t) | 14000 |
| FP-58 | 80 | H | 6 | H | C$_4$H$_9$(t) | 12000 |
| FP-59 | 60 | H | 6 | H | C$_4$H$_9$(t) | 13000 |
| FP-60 | 90 | H | 6 | H | C$_6$H$_{13}$(n) | 10000 |
| FP-61 | 80 | H | 6 | H | C$_6$H$_{13}$(n) | 8000 |
| FP-62 | 60 | H | 6 | H | C$_6$H$_{13}$(n) | 12000 |
| FP-63 | 80 | H | 4 | H | C$_2$H$_5$ | 25000 |
| FP-64 | 80 | H | 4 | H | C$_4$H$_9$(n) | 32000 |
| FP-65 | 80 | H | 4 | H | C$_4$H$_9$(iso) | 28000 |
| FP-66 | 80 | H | 4 | H | C$_4$H$_9$(t) | 25000 |
| FP-67 | 80 | H | 4 | H | C$_6$H$_{13}$(n) | 20000 |
| FP-68 | 80 | H | 8 | H | C$_2$H$_5$ | 5000 |
| FP-69 | 80 | H | 8 | H | C$_4$H$_9$(n) | 6000 |
| FP-70 | 80 | H | 8 | H | C$_4$H$_9$(iso) | 5000 |
| FP-71 | 80 | H | 8 | H | C$_4$H$_9$(t) | 7000 |
| FP-72 | 80 | H | 8 | H | C$_6$H$_{13}$(n) | 5000 |
| FP-78 | 80 | H | 4 | CH$_3$ | C$_2$H$_5$ | 12000 |
| FP-79 | 80 | H | 4 | CH$_3$ | C$_4$H$_9$(n) | 14000 |
| FP-80 | 80 | H | 4 | CH$_3$ | C$_4$H$_9$(iso) | 20000 |
| FP-81 | 80 | H | 4 | CH$_3$ | C$_4$H$_9$(t) | 22000 |
| FP-82 | 80 | H | 4 | CH$_3$ | C$_6$H$_{13}$(n) | 18000 |
| FP-83 | 80 | CH$_3$ | 4 | CH$_3$ | C$_2$H$_5$ | 6000 |
| FP-84 | 80 | CH$_3$ | 4 | CH$_3$ | C$_4$H$_9$(n) | 8000 |
| FP-85 | 80 | CH$_3$ | 4 | CH$_3$ | C$_4$H$_9$(iso) | 7000 |
| FP-86 | 80 | CH$_3$ | 4 | CH$_3$ | C$_4$H$_9$(t) | 12000 |
| FP-87 | 80 | CH$_3$ | 4 | CH$_3$ | C$_6$H$_{13}$(n) | 5000 |

The amount of the polymerization unit of the fluoroaliphatic group-containing monomer constituting the fluoroaliphatic group-containing (co)polymer is preferably in excess of 10 mass %, more preferably from 50 to 100 mass %, and most preferably from 75 to 100 mass % when it is important to prevent unevenness of the antiglare layer, or most preferably from 50 to 75 mass % when a low refractive index layer is coated on the antiglare layer (the amount is based on all polymerization units constituting the fluoroaliphatic group-containing (co)polymer).

(Silicone-Based Leveling Agent)

The silicone-based leveling agent is described below.

Preferred examples of the silicone-based compound include those having a substituent at the terminal and/or in the side chain of a compound chain containing a plurality of dimethylsilyloxy unites as the repeating unit. The compound chain containing dimethylsilyloxy as the repeating unit may contain a structure unit other than dimethylsilyloxy. A plurality of substituents which may be the same or different are preferably present. Preferred examples of the substituent include groups containing a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group.

The molecular weight is not particularly limited but is preferably 100,000 or less, more preferably 50,000 or less, still more preferably from 1,000 to 30,000, and most preferably from 1,000 to 20,000.

The silicon atom content of the silicone-based compound is not particularly limited but is preferably 18.0 mass % or more, more preferably from 25.0 to 37.8 mass %, and most preferably from 30.0 to 37.0 mass %.

Preferred examples of the silicon-based compound include, but are not limited to, "X-22-174DX", "X-22-2426", "X-22-164B", "X22-164C", "X-22-170DX", "X-22-176D" and "X-22-1821" (all trade names) produced by Shin-Etsu Chemical Co., Ltd.; "FM-0725", "FM-7725", "FM-4421", "FM-5521", "FM6621" and "FM-1121" (all trade names) produced by Chisso Corp.; "DMS-U22", "RMS-033", "RMS-083", "UMS-182", "DMS-H21", "DMS-H31", "HMS-301", "FMS121", "FMS123", "FMS131", "FMS141" and "FMS221" (all trade names) produced by Gelest; "SH200", "DC11PA", "SH28PA", "ST80PA", "ST86PA", "ST97PA", "SH550", "SH710", "L7604", "FZ-2105", "FZ2123", "FZ2162", "FZ-2191", "FZ2203", "FZ-2207", "FZ-3704", "FZ-3736", "FZ-3501", "FZ-3789", "L-77", "L-720", "L-7001", "L-7002", "L-7604", "Y-7006", "SS-2801", "SS-2802", "SS-2803", "SS-2804" and "SS-2805" (all trade names) produced by Dow Corning Toray Co., Ltd.; and "TSF400", "TSF401", "TSF410", "TSF433", "TSF4450" and "TSF4460" (all trade names) produced by GE Toshiba Silicones.

The amount of the fluorine-based leveling agent or silicone-based leveling agent added is preferably from 0.001 to 1.0 mass %, more preferably from 0.01 to 0.2 mass %, based on die coating solution.

[Solvent of Coating Solution for Low Refractive Index Layer]

For reducing the dry unevenness of the low refractive index layer, the solvent of the coating solution for the low refractive index layer of the antiglare film of the present invention preferably contains a low boiling point solvent having a boiling point of 120° C. or less in an amount of 50 to 100 mass %, preferably from 70 to 100 mass %, more preferably from 90 to 100 mass %, based on the entire solvent mass of the coating solution for the low refractive index layer. By virtue of changing as above the solvent composition for the low refractive index layer of the sample according to the present invention, which is described later, the effect is confirmed in the surface state evaluation of the low refractive index layer. Specific representative examples of the solvent of the coating solution are methyl ethyl ketone, methyl isobutyl ketone and toluene, each ensuring good solubility of the fluorine-containing polymer in the low refractive index layer.

[Thickening Agent of Antiglare Layer]

In the antiglare layer, a thickening agent may be used for adjusting the viscosity of the coating solution.

By increasing the viscosity, precipitation of the particle contained may be suppressed or the unevenness-preventing effect may be expected. The thickening agent as used herein means a substance which causes increase in the viscosity of a liquid when added. The increment of viscosity of the coating solution, which is brought about by the addition, is preferably from 0.05 to 50 cP, more preferably from 1 to 50 cP, and most preferably from 2 to 50 cP.

The high molecular polymer used as the thickening agent preferably contains substantially no fluorine atom and/or substantially no silicon atom. The term "substantially" as used herein means that the content of fluorine atom and/or silicon atom is 0.1 mass % or less, preferably 0.01 mass % or less, based on the mass of the high molecular polymer.

A high molecular polymer is preferred as the thickening agent, and specific examples thereof include, but are not limited to, the followings.

High molecular polymer thickening agent:
  polyacrylic acid ester,
  polymethacrylic acid ester,
  polyvinyl acetate,
  polyvinyl propionate,
  polyvinyl butyrate,
  polyvinylbutyral,
  polyvinylformal,
  polyvinylacetal,
  polyvinylpropanal,
  polyvinylhexanal,
  polyvinylpyrrolidone,
  cellulose acetate,
  cellulose propionate, and
  cellulose acetate butyrate.

Among these, preferred are a polymethacrylic acid ester (specifically, polymethyl methacrylate and polyethyl methacrylate), polyvinyl acetate, polyvinyl propionate, cellulose propionate and cellulose acetate butyrate.

The mass average molecular weight of these polymers is preferably from 100,000 to 1,000,000.

Other than these, a known viscosity adjusting agent or thixotropy imparting agent, such as smectite, fluorotetrasilicon mica, bentonite, silica, montmorillonite and sodium polyacrylate described in JP-A-8-325491, and ethyl cellulose, polyacrylic acid and organic clay described in JP-A-10-219136, may be used.

[Transparent Support]

The transparent support for use in the antiglare film of the present invention is preferably a plastic film. Examples of the polymer forming the plastic film include a cellulose ester {e.g., triacetyl cellulose, diacetyl cellulose; representatively, "TAC-TD80U", "TD80UF", etc. produced by Fujifilm Corp.}, a polyamide, a polycarbonate, a polyester (e.g., polyethylene terephthalate, polyethylene naphthalate), a polystyrene, a polyolefin, a norbornene-based resin {"ARTON" (trade name) produced by JSR Corp.} and an amorphous polyolefin {"ZEONEX" (trade name) produced by Zeon Corp.}. Among these, preferred are triacetyl cellulose, polyethylene terephthalate and polyethylene naphthalate, and more preferred is triacetyl cellulose. Furthermore, a cellulose acylate film substantially free of a halogenated hydrocarbon such as dichloromethane and the production method thereof are described in *JIII Journal of Technical Disclosure* (No. 2001-1745, issued Mar. 15, 2001; hereinafter simply referred to as Technical Disclosure No. 2001-1745), and the cellulose acylate described therein can also be preferably used in the present invention.

The thickness of the transparent support is, in view of response to need for thinning and handling (transport suitability), suitably from 20 to 200 μm, preferably from 30 to 100 μm, more preferably from 35 to 90 μm, and most preferably front 40 to 80 μm.

The width of the transparent support may be arbitrarily selected but in view of response to increase in the size of an image display apparatus, handling (transport suitability), yield and productivity, the width is usually from 100 to 5,000 mm, preferably from 800 to 3,000 mm, more preferably from 1,000 to 2,000 mm.

[Properties of Antiglare Film]

The entire beam transmittance of the antiglare film of the present invention is measured according to JIS-K7316. The entire beam transmittance is preferably 85% or more in view of front contrast, more preferably 90% or more, still more preferably 92% or more.

In view of antifouling property, the contact angle for pure water on the surface of the antiglare film of the present invention as measured in an environment of 25° C. and 60% RH is preferably 90° or more, more preferably 95° or more, still more preferably 100° or more. Also, the change in the contact angle between before and after saponification treatment (described later) required at the processing into a polarizing plate is preferably 5° or less, more preferably 3° or less, and most preferably 1° or less.

In view of dust protection, the vertical separation charge of the antiglare film of the present invention for polyethylene terephthalate as measured in an environment of 25° C. and 60% RH is preferably from −500 to +500 pc (pico coulomb)/cm$^2$, more preferably from −200 to +200 pc/cm$^2$, still more preferably from −100 to +100 pc/cm$^2$.

The vertical separation charge is measured as follows.

The measurement sample is previously left standing in an environment of 25° C. and 60% RH for 2 hours or more. The measuring apparatus comprises a table on which the measurement sample is placed, and a head for holding the other party film, which can repeat the pressing from above to the measurement sample and the separation therefrom. A polyethylene terephthalate is loaded in this head and after removing electricity from the measuring portion, the head is repeatedly pressed to and separated from the measurement sample. The electric charge value is read at the first separation and at the fifth separation, and the obtained values are averaged. By varying the sample, this operation is repeated on three samples. All values are averaged and the obtained value is taken as the vertical separation charge.

In the case of an antiglare film where at least one member out of the constituent materials of the low refractive index layer comprises a fluorine-containing material, for adjusting the vertical separation charge to fall in the preferred range above, the photoelectron spectral intensity ratio F/C is preferably from 0.5 to 5, more preferably from 0.5 to 3, still more preferably from 0.5 to 2. Also, for adjusting the vertical separation charge, silicone having high surface orientation property similarly to fluorine is preferably incorporated and in this case, the photoelectron spectral intensity ratio Si/C is preferably from 0.05 to 0.5, more preferably from 0.1 to 0.5, still more preferably from 0.2 to 0.5.

Incidentally, F/C ($=F_{1s}/C_{1s}$) and Si/C ($=Si_{2p}/C_{1s}$) are values measured as follows.

The photoelectron spectra of $Si_{2p}$, $F_{1s}$ and $C_{1s}$ on the outermost surface of the antiglare film are measured by "ESCA-3400" (degree of vacuum: 1×10$^{-5}$ Pa, X-ray source: target Mg, voltage: 12 kV, current: 20 mA) manufactured by Shimadzu Corp.

For enhancing the dust protection, this may be attained by adjusting the surface resistance value of the antiglare film of the present invention to less than 1×10$^{11}$ Ω/square, preferably less than 1×10$^{10}$ Ω/square, more preferably less than 1×10$^9$ Ω/square. The measuring method of the surface resistance value is described later.

[Antistatic Layer]

In the antiglare film of the present invention, an antistatic layer containing various electrically conductive particles may be provided so as to impart electrical conductivity.

(Electrically Conductive Particle)

The electrically conductive particle is preferably formed of a metal oxide or nitride. Examples of the metal oxide or nitride include tin oxide, indium oxide, zinc oxide and titanium nitride, with tin oxide and indium oxide being preferred.

The electrically conductive inorganic particle comprises such a metal oxide or nitride as the main component and may further contain other elements. The "main component" means a component of which Content (mass %) is largest among the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to elevate the electrical conductivity of tin oxide or indium oxide, it is preferred to add Sb, P, B, Nb, In, V or a halogen atom. An Sb-containing tin oxide (ATO) and an Sn-containing indium oxide (ITO) are particularly preferred. The proportion of Sb in ATO is preferably from 3 to 20 mass %, and the proportion of Sn in ITO is preferably from 5 to 20 mass %.

The average primary particle diameter of the electrically conductive inorganic particle for use in the antistatic layer is preferably from 1 to 150 nm, more preferably from 5 to 100 nm, and most preferably from 5 to 70 nm. The average particle diameter of the electrically conductive inorganic particle in the antistatic layer formed is from 1 to 200 nm, preferably from 5 to 150 nm, more preferably from 10 to 100 nm, and most preferably from 10 to 80 nm. The average particle diameter of the electrically conductive inorganic particle is an average diameter weighed by the mass of the particle and can be measured by a light scattering method or an electron micrograph.

The specific surface area of the electrically conductive inorganic particle is preferably from 10 to 400 m$^2$/g, more preferably from 20 to 200 m$^2$/g, and most preferably from 30 to 150 m$^2$/g.

The electrically conductive inorganic particle may be surface-treated. The surface treatment is performed using an inorganic compound or an organic compound. Examples of the inorganic compound for use in the surface treatment include alumina and silica. A silica treatment is preferred. Examples of the organic compound for use in the surface treatment include a polyol, an alkanolamine, a stearic acid, a silane coupling agent and a titanate coupling agent, with a silane coupling agent being most preferred. Two or more kinds of surface treatments may be performed in combination.

The shape of the electrically conductive inorganic particle is preferably rice grain-like, spherical, cubic, spindle-like or amorphous.

Two or more kinds of electrically conductive particles may be used in combination in the antistatic layer or as a film. The proportion of the electrically conductive inorganic particle in the antistatic layer is preferably from 20 to 90 mass %, more preferably from 25 to 85 mass %, still more preferably from 30 to 80 mass %. Also, the electrically conductive inorganic particle can be used in a dispersion state for the formation of the antistatic layer.

As for the measuring method of the surface resistance value, the sample film is previously left standing in an environment of 25° C. and 60% RH for 2 hours or more and thereafter, the surface resistance on the coating layer side is measured by an ultra-insulating resistance/microammeter "TR860I" {manufactured by Advantest Corp.}.

The dynamic friction coefficient on the surface of the antiglare film of the present invention is preferably 0.3 or less in view of enhancing the scratch resistance (preventing the stress concentration), more preferably 0.2 or less, still more preferably 0.1 or less.

The method of measuring the dynamic friction coefficient is as follows.

The measurement sample is previously left standing in an environment of 25° C. and 60% RH for 2 hours and then measured by a dynamic friction measuring meter "HEIDON- 14" with a 5 mmφ stainless steel ball under a load of 100 g at a speed of 60 cm/min, and the obtained value is used.

In the antiglare film of the present invention, assuming that the average value of 5° regular reflectance in the wavelength region of 450 to 650 nm is A and the average value of integrated reflectance in that region is B, in view of denseness of black display in a bright room environment or enhancement of bright-room contrast, B is preferably 3% or less and B-A is preferably 1.5% or less. B is more preferably 2% or less, still more preferably 1% or less, and B-A is more preferably 1% or less, still more preferably 0.5% or less.

The average values of 5° regular reflectance and integrated reflectance are measured as follows.

In the measurement of the specular reflectivity, an adapter "ARV-474" is loaded in a spectrophotometer "V-550" [manufactured by JASCO Corp.], the specular reflectivity for the outgoing angle of −5° at an incident angle of 5° is measured in the wavelength region of 380 to 780 nm, and an average specular reflectivity at 450 to 650 nm is calculated. In the measurement of the integrated reflectance, an adapter "ILV-471" is loaded in a spectrophotometer "V-550" [manufactured by JASCO Corp.], the integrated reflectance at an incident angle of 5° is measured in the wavelength region of 330 to 780 nm, and an average integrated reflectance at 450 to 650 nm is calculated.

The surface strength of the antiglare layer is preferably H or more, more preferably 2H or more, still more preferably 3H or more, in the pencil hardness test.

Furthermore, in the Taber lest according to JIS K5400, the abrasion loss of the specimen between before and after the test is preferably smaller.

[Production Method of Antiglare Film]

The antiglare film of the present invention can be formed by the following method, but the present invention is not limited thereto.

[Preparation of Coating Solution]

A coating solution containing components for forming each layer is prepared. At this time, increase in the percentage of water content in the coating solution can be prevented by minimizing the volatilization volume of the solvent. The percentage of water content in the coating solution is preferably 5% or less, more preferably 2% or less. The volatilization volume of the solvent can be suppressed, for example, by enhancing the closeness at the stirring after materials are charged into a tank or by minimizing the contact area of the coating solution with air at the liquid transfer operation. Also, means for reducing the percentage of water content in the coating solution may be provided during, before or after the coating.

[Filtration]

The coating solution used for coating is preferably filtered before coating. The filtration is preferably preformed using a fitter having a pore size as small as possible within the range of not allowing for elimination of the components in the coating solution. In the filtration, a filter having an absolute filtration accuracy of 0.1 to 50 μm is used. A filter having an absolute filtration accuracy of 0.1 to 40 μm is more preferred. The filter thickness is preferably from 0.1 to 10 mm, more preferably from 0.2 to 2 mm. In this case, the filtration is preferably performed under a filtration pressure of 1.5 MPa or less, more preferably 1.0 MPa or less, still more preferably 0.2 MPa or less.

The filter member for filtration is not particularly limited as long as it does not affect the coating solution. Specific examples thereof are the same as those of the filtration member described above for the wet dispersion of an inorganic compound. It is also preferred to ultrasonically disperse the filtered coating solution immediately before coating ad assist in removing bubbles or keeping the dispersed state of the dispersion.

[Treatment Before Coating]

The transparent support for use in the present invention is preferably subjected, before coating, to a heat treatment for correcting the base deformation or to a surface treatment for improving the coatability or adhesion to the coating layer. The specific method for surface treatment includes a corona discharge treatment, a glow discharge treatment, a flame treatment, an acid treatment, an alkali treatment and at ultraviolet irradiation treatment. It is also preferred to provide an undercoat layer as described in JP-A-7-333433.

Furthermore, a dedusting step is preferably performed as a pre-step before coating, and examples of the dedusting method used therefor include a dry dedusting method such as a method of pressing a nonwoven fabric, a blade or the like against the film surface described in JP-A-59-150571; a method of blowing an air having high cleanliness at a high speed to separate attached matters from the film surface, and sucking these matters through a proximate suction port described in JP-A-10-309553; and a method of blowing a compressed air under ultrasonic vibration to separate attached matters, and sucking these matters described in JP-A-7-333613 {for example, NEW ULTRA-CLEANER manufactured by Shinko Co., Ltd.}. Also, a wet dedusting method may be used, such as a method of introducing the film into a cleaning tank, and separating attached matters by using an ultrasonic vibrator; a method of supplying a cleaning solution to the film, and blowing an air at a high speed, followed by sucking described in JP-B-49-13020; and a method of continuously rubbing the web with a liquid-moistened roll, and jetting a liquid onto the rubbed face, thereby cleaning the web, described in JP-A-2001-38306. Among these dedusting methods, an ultrasonic dedusting method and a wet dedusting method are preferred in view of the dedusting effect.

Before performing such a dedusting step, the static electricity on the film support is preferably destaticized so as to elevate the dedusting efficiency and prevent attachment of dusts. As for the destaticizing method, an ionizer of corona discharge type, an ionizer of light irradiation type (e.g., UV, soft X-ray), and the like may be used. The electricity charged on the transparent support before and after dedusting and coating is preferably 1,000 V or less, more preferably 300 V or less, still more preferably 100 V or less.

From the standpoint of maintaining tie planarity of the film, in these treatments, the temperature of the transparent support such as cellulose acylate film is preferably kept to be not more than Tg of the polymer constituting the film and in the case of cellulose acylate film, preferably kept to be 150° C. or less.

In the case where the cellulose acylate film which is the preferred transparent support of the antiglare film is adhered to a polarizing film as in using the antiglare film of the present invention for a polarizing plate protective film, in view of adhesion to the polarizing film, an acid or alkali treatment, that is, a saponification treatment for cellulose acylate, is preferably performed.

In view of adhesion or the like, the surface energy of the cellulose acylate film as the transparent support is preferably 55 mN/m or more, more preferably from 60 to 75 mN/m. The surface energy can be adjusted by the above-described surface treatment.

[Coating]

Each layer of the film of the present invention can be formed by the following coating methods, but the present invention is not limited thereto. A known method such as dip coating method, air knife coating method, curtain coating method, roller coating method, wire bar coating method, gravure coating method, extrusion coating method (die coating method) (see, U.S. Pat. No. 2,681,294 and International Publication WO2005/123274) and microgravure coating method, is used. Among these, a microgravure coating method and a die coating method are preferred.

The microgravure coating method for use in tie present invention is a coating method where a gravure roll having a diameter of about 10 to 100 mm, preferably from about 20 to 50 mm, and having a gravure pattern engraved on the entire circumference is disposed under the support and at the same time as rotating the gravure roll in the direction reverse to the support-conveying direction, the surplus coating solution is scraped off from the surface of the gravure roll by a doctor blade, thereby allowing a constant amount of the coating solution to be transferred to and coated on the bottom surface of the support at the position where the top surface of the support is in a free state. A roll-form transparent support is continuously unrolled and on one side of the unrolled support, at least one layer out of at least the antiglare layer and the low refractive index layer containing a fluorine-containing olefin-based polymer can be coated by the microgravure coating method.

As for the coating conditions in the microgravure coating method, the number of lines in the gravure pattern engraved on the gravure roll is preferably from 50 to 800 lines/inch, more preferably from 100 to 300 lines/inch, the depth of the gravure pattern is preferably from 1 to 600 μm, more preferably from 5 to 200 μm, the rotation number of the gravure roll is preferably from 3 to 800 rpm, more preferably from 5 to 200 rpm, and the transparent support-conveying speed is preferably from 0.5 to 100 m/min, more preferably from 1 to 50 m/min.

In order to provide the film of the present invention with high productivity, an extrusion method (die coating method) is preferably used. Particularly, coating can be preferably performed by the extrusion method described in JP-A-2006-122899.

The die coating method is a pre-weighing system and therefore, a stable film thickness can be easily ensured. Also, this coating method can apply a low-amount coating solution at a high speed with good film thickness stability. The coating may be performed by other coating methods, but in a dip coating method, the coating solution in a liquid-receiving tank is inevitably vibrated and stepwise unevenness is readily generated. In a reverse roll coating method, stepwise unevenness is liable to occur due to eccentricity or deflection of the roll involved in the coating. Also, these coating methods are a post-weighing system and therefore, a stable film thickness can be hardly ensured. In view of productivity, the coating is preferably performed using the above-described die coating method at a rate of 25 m/min or more.

[Drying]

After the coating on the support directly or through another layer, the film of the present invention is preferably conveyed in the form of a web to a heated zone for drying the solvent.

As for the method of drying the solvent, various known techniques may be utilized. Specific examples thereof include those described in JP-A-2001-296817, JP-A-2001-314798, JP-A-2003-126768, JP-A-2003-315505 and JP-A-2004-34002.

The temperature in the drying zone is preferably from 25 to 140° C. and it is preferred that the temperature in the first half of the drying zone is relatively low and the temperature in the second half is relatively high. However, the temperature is preferably not more than the temperature at which the components other than the solvent contained in the composition of the coating solution for each layer start volatilizing. For example, some commercially available photoradical generators used in combination with an ultraviolet curable resin volatilize by about several tens of percent within several minutes in warm air at 120° C., and some monofunctional or bifunctional (meth)acrylic acid ester monomers or the like allow progress of their volatilization in warm air at 100° C. In such a case, as described above, the drying zone temperature is preferably not more than the temperature at which the components other the solvent contained in the coating composition for each layer start volatilizing.

In order to prevent drying unevenness, the drying air after applying the coating solution for each layer on the transparent support is preferably blown at an air velocity of 0.1 to 2 m/see on the coating film surface when the solid content concentration of the coating solution is from 1 to 50%. Also, in the drying zone after applying the coating solution for each layer on the transparent support, the difference in the temperature between the support and the conveying roll in contact with the surface opposite the coating surface of the support is preferably set to be from 0 to 20° C., because drying unevenness due to uneven heat transfer on the conveying roll can be prevented.

[Curing]

The antiglare film of the present invention after drying the solvent is passed in the form of a web through a zone for curing each film coating by the irradiation of ionizing radiation and/or under heat, whereby the film coating can be cured. The species of the ionizing radiation for use in the present invention is not particularly limited and according to the kind of the curable composition for forming a film, the radiation may be appropriately selected from ultraviolet ray, electron beam, near ultraviolet ray, visible light, near infrared ray, infrared ray, X-ray and the like, but ultraviolet ray and electron beam are preferred and ultraviolet is more preferred in that the handling is easy and a high energy can be easily obtained.

As regards the light source of emitting ultraviolet ray for photopolymerizing an ultraviolet-curable compound, any light source may be used as long as it emits an ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. Also, an ArF excimer laser, a KrF excimer laser, an excimer lamp, a synchrotron radiation light and the like may be used. Among these, an ultrahigh-pressure mercury lamp, a high-pressure mercury lamp, a low-pressure mercury lamp, a carbon arc, a xenon arc and a metal halide lamp can be preferably used.

An electron beam may also be similarly used. Examples of the electron beam include electron beams having an energy of 50 to 1,000 keV, preferably from 100 to 300 keV, emitted from various electron beam accelerators such as Cockroft-Walton type, Van de Graff type, resonance transformer type, insulating core transformer type, linear type, dynamitron type and high frequency type.

The irradiation conditions vary depending on individual lamps, but the amount of light irradiated is preferably 10 mJ/cm$^2$ or more, more preferably from 50 to 10,000 mJ/cm$^2$, still more preferably from 50 to 2,000 mJ/cm$^2$. At this time, the irradiation dose distribution in the web width direction is preferably, including both edges, from 50 to 100%, more preferably from 80 to 100%, based on the maximum irradiation dose in the center.

In the present invention, at least one layer out of layers stacked on the transparent support is preferably cured by a step of irradiating ionizing radiation and at the same time, irradiating the ionizing radiation in an atmosphere having an oxygen concentration of 1,000 ppm or less, preferably 500 ppm or less, more preferably 100 ppm or less, most preferably 50 ppm or less, for 0.5 seconds or more from the initiation of ionizing radiation irradiation in the state of the layer being heated at a film surface temperature of 50° C. or more.

It is also preferred that the layer is heated in an atmosphere having a low oxygen concentration simultaneously with and/or successively to the irradiation of ionizing radiation. In particular, the low refractive index layer which is an outermost layer and has a small thickness is preferably cured by this method. The curing reaction is accelerated by the heat and a film excellent in the physical strength and chemical resistance can be formed.

The time for which the ionizing radiation is irradiated is preferably from 0.5 to 60 seconds, more preferably from 0.7 to 10 seconds. When the irradiation time is 0.5 seconds or more, the curing reaction can be completed and satisfactory curing can be performed. Also, maintenance of the low oxygen condition for a long time requires large-scale equipment and a large amount of inert gas such as nitrogen. Therefore, the irradiation time is preferably 60 seconds or less.

As for the means to reduce the oxygen concentration to 1,000 ppm or less, replacement of the atmospheric air with another gas is preferred, and replacement with nitrogen (nitrogen purging) is more preferred.

When the conditions are set such that an inert gas is supplied to the ionizing radiation irradiation chamber (sometimes referred to as a "reaction chamber") for performing the curing reaction by ionizing radiation and at the same time, slightly blown out to the web inlet side of the reaction chamber, not only the carry-over air associated with the web conveyance can be eliminated to effectively decrease the oxygen concentration in the reaction chamber but also the substantial oxygen concentration on the electrode surface greatly susceptible to curing inhibition by oxygen can be efficiently reduced. The direction to which the inert gas flows on the web inlet side of the reaction chamber can be controlled by adjusting the balance between air supply and air discharge in the reaction chamber. Blowing of an inert gas directly on the web surface is also preferred as the method for removing the carry-over air.

Furthermore, when a pre-chamber is provided before the reaction chamber and the oxygen on the web surface is previously eliminated, the curing can be allowed to proceed more efficiently. In order to efficiently use the inert gas, the gap between the side surface constituting the web inlet side of the ionizing radiation reaction chamber or pre-chamber and the web surface is preferably from 0.2 to 15 mm, more preferably from 0.2 to 10 mm, and most preferably from 0.2 to 5 mm. However, for continuously producing the web, the web needs to be joined and spliced and a method of laminating the webs by means of a bonding tape or the like is widely employed for joining. Therefore, when the gap between the inlet surface of the ionizing radiation reaction chamber or pre-chamber and the web is too small, there arises a problem that the bonding member such as bonding tape is hung up. To solve this problem, in the case of forming a narrow gap, at least a part of the inlet surface of the ionizing radiation reaction chamber or pre-chamber is preferably made movable, so that the gap can be enlarged for the thickness of the bonded part when the bonded part enters the chamber. This construction may be realized by a method where the inlet surface of the ionizing radiation reaction chamber or pre-chamber is made movable back and forth in the running direction and moved back and forth to enlarge the gap when the bonded part passes therethrough, or a method where the inlet surface of the ionizing radiation reaction chamber or pre-chamber is made movable perpendicularly to the web surface and moved vertically to enlarge tie gap when the bonded part passes therethrough.

The ultraviolet ray may be irradiated every time when a plurality of constituent layers constituting the antiglare film of the present invention each is formed, or may be irradiated after the layers are stacked. Alternatively, some of these layers may be irradiated in combination. In view of productivity, the ultraviolet ray is preferably irradiated after stacking multiple layers.

In the present invention, at least one layer stacked on the transparent support may be cured by irradiating ionizing radiation a plurality of times. In this case, the irradiation of ionizing radiation is preferably performed at least twice in continuous reaction chambers where the oxygen concentration does not exceed 1,000 ppm. By performing the irradiation of ionizing radiation a plurality of times in reaction chambers having the same low oxygen concentration, the reaction time necessary for curing can be effectively ensured. Particularly, in the case of increasing the production speed for high productivity, the ionizing radiation needs to be irradiated a plurality of times so as to ensure an ionizing radiation energy necessary for the curing reaction.

In the case where the curing percentage (100−percentage of residual functional group content) reaches a certain value less than 100%, when another layer is provided thereon and cured by ionizing radiation and/or heat, the curing percentage of the lower layer becomes higher than that before providing the upper layer and the adhesion between the lower layer and the upper layer is advantageously improved.

[Handling]

In order to continuously produce the antiglare film of the present invention, a step of continuously delivering a roll-like transparent support film, a step of coating and drying the coating solution, a step of curing the film coating, and a step of taking up the support film having thereon the cured layer are performed.

A support is continuously delivered from a roll-like transparent support to a clean room, static electricity charged to the support is removed by a destaticizing apparatus in the clean room, and foreign matters adhering to the transparent support are then removed by a dedusting apparatus. Subsequently, a coating solution is coated on the support in a coating part disposed in the clean room, and the coated transparent support is conveyed to a drying room and dried.

The transparent support having thereon the dried coating layer is delivered from the drying room to a curing room, where the monomer contained in the coating layer is polymerized to effect curing. The transparent support having thereon the cured layer is further conveyed to a curing part, where the curing is completed, and the transparent support having thereon the completely cured layer is taken up into a roll.

The above-described steps may be performed every time when each layer is formed, or a plurality of coating part-drying room-curling part lines may be provided to continuously perform the formation of respective layers.

In producing the antiglare film of the present invention, it is preferred that in combination with the above-described microfiltration operation of the coating solution, the coating step in the coating part and the drying step in the drying room are performed in an atmosphere having high air cleanliness and dirt and dust on the film are satisfactorily removed before performing the coating. The air cleanliness in the coating step and drying step is, according to the standard of air cleanliness in US Federal Standard 209E, preferably not lower than class 10 (the number of particles of 0.5 μm or more is 353 particles/m$^3$ or less), more preferably not lower than class 1 (the number of particles of 0.5 μm or more is 35.5 particles/m$^3$ or less). The air cleanliness is preferably high also in the parts other than the coating-drying steps, such as delivery part and take-up part.

[Saponification Treatment]

In producing a polarizing plate by using the antiglare film of the present invention for one protective film out of two surface protective films of a polarizing film, the surface on the side to be laminated with the polarizing film is preferably hydrophilized to improve the adhesion on the bonding surface.

a. Method by Dipping in Alkali Solution

This is a technique of dipping the film in an alkali solution under appropriate conditions to saponify all the surface having reactivity with an alkali on the entire film surface. This method requires no special equipment and is preferred in view of cost. The alkali solution is preferably an aqueous sodium hydroxide solution. The concentration is preferably from 0.5 to 3 mol/L, more preferably from 1 to 2 mol/L. The liquid temperature of the alkali solution is preferably from 30 to 75° C., more preferably from 40 to 60° C.

The combination of the saponification conditions is preferably a combination of relatively mild conditions but may be selected according to the materials or construction of the film or the objective contact angle. The film after dipping in an alkali solution is preferably well washed with water or dipped in a dilute acid to neutralize the alkali component and allow for no remaining of the alkali component in the film.

By applying a saponification treatment, the surface opposite the surface having the coating layer is hydrophilized. The polarizing plate protective film is used by bonding the hydrophilized surface of the transparent support to the polarizing film.

The hydrophilized surface is effective for improving the adhesion to the adhesive layer comprising polyvinyl alcohol as the main component.

As for the saponification treatment, the contact angle for water on the transparent support surface opposite the surface having the coating layer is preferably lower in view of adhesion to the polarizing film, but, on the other hand, in the dipping method, the surface having the coating layer as well as the inside of the layer are damaged simultaneously by an alkali and therefore, it is important to select minimum necessary reaction conditions. When the contact angle for water on the transparent support surface on the opposite side is used as the index for damage of each layer by an alkali, in the case particularly where the transparent support is triacetyl cellulose, the contact angle is preferably from 10 to 50°, more preferably from 30 to 50°, still more preferably from 40 to 50°. A contact angle of 50° or more is preferred because no problem arises in the adhesion to the polarizing film, and a contact angle of 10° or more is preferred because the film is not so much damaged and the physical strength is not impaired.

b. Method by Coating of Alkali Solution

In order to avoid the damage of each layer in the dipping method, an alkali solution coating method where an alkali solution is coated only on the surface opposite the surface having the coating layer under appropriate conditions and the film is then heated, water-washed and dried, is preferably used. In this case, the "coating" means to contact an alkali solution or the like only with the surface to be saponified and includes spraying and contact with a belt or the like impregnated with the solution, other than coating.

When such a method is employed, equipment and step for coating an alkali solution are separately required and therefore, the cost is higher than in the dipping method of (a). However, since the alkali solution comes into contact only with the surface to be saponified, a layer using a material weak to an alkali solution can be provided on the opposite surface. For example, a vapor-deposition film or a sol-gel film is subject to various effects such as corrosion, dissolution and separation by an alkali solution and is not preferably provided in the case of dipping method, but in this coating method, such a film is not contacted with the solution and therefore, can be used without problem.

The saponification methods (a) and (b) both can be performed after unrolling a roll-like support and forming respective layers and therefore, the treatment may be added after the film production step and performed in a series of operations. Furthermore, by continuously performing also a step of laminating the film to a polarizing plate comprising a support unrolled similarly, a polarizing plate can be produced with higher efficiency than in the case of performing the same operations in the sheet-fed manner.

c. Method of Performing Saponification with Protection by Laminate Film

Similarly to (b) above, when the coating layer is insufficient in the resistance against an alkali solution, a method of, after a final layer is formed, laminating a laminate film on the surface where the final layer is formed, then dipping the stack in an alkali solution to hydrophilize only the triacetyl cellulose surface opposite the surface where the final layer is formed, and thereafter peeling off the laminate film, may be employed. Also in this method, a hydrophilizing treatment enough as a polarizing plate protective film can be applied without damaging the coating layer only to the surface of the triacetyl cellulose film as the transparent support, opposite the surface where the final layer is formed. As compared with the method (b), this method is advantageous in that a special apparatus for coating an alkali solution is not necessary, though the laminate film remains as a waste.

d. Method by Dipping in Alkali Solution After Formation Up to Mid-Layer

In the case where the layers up to a lower layer have resistance against an alkali solution but a layer thereon is insufficient in the resistance against an alkali solution, a method of forming the layers up to the lower layer, then dipping the stack in an alkali solution to hydrophilize both surfaces, and thereafter forming the upper layer thereon, may be employed. The production process becomes cumbersome but this method is advantageous in that, for example, in a film comprising an antiglare layer and a low refractive index layer formed of a fluorine-containing sol-gel film, when the layers have a hydrophilic group, the interlayer adhesion between the antiglare layer and the low refractive index layer is enhanced.

e. Method of Forming Coating Layer on Previously Saponified Triacetyl Cellulose Film After previously saponifying a triacetyl cellulose film as the transparent support, for example, by dipping it in an alkali solution, a coating layer may be formed on either one surface directly or through another layer. In the case of performing the saponification by dipping the film in an alkali solution, the interlayer adhesion between the coating layer and the triacetyl cellulose surface hydrophilized by the saponification is sometimes worsened. In such a case, the problem can be overcome by applying, after the saponification, a treatment such as corona discharge or glow discharge only to the surface where the coating layer is to be formed, thereby removing the hydrophilized surface, and then forming the coating layer.

Also, when the coating layer has a hydrophilic group, good interlayer adhesion may be obtained.

<Polarizing Plate>
[Production of Polarizing Plate]
[Construction of Polarizing Plate]

The antiglare film of the present invention may be used for either one or both of the protective films of a polarizing plate comprising a polarizing film and protective films disposed on both sides thereof, to provide an antiglare polarizing plate.

While using the antiglare film of the present invention as one protective film, a normal cellulose acetate film may be used for the other protective film, but a cellulose acetate film produced by a solution film-forming method and stretched in the width direction of a rolled film form at a stretch ratio of 10 to 100% is preferably used.

Furthermore, in the polarizing plate of the present invention, it is also preferred that one surface is the antiglare film of the present invention and the other protective film is an optically compensatory film having an optically anisotropic layer comprising a liquid crystalline compound.

[Polarizing Film]

The polarizing film includes an iodine-based polarizing film, a dye-based polarizing film using a dichroic dye, and a polyene-based polarizing film. The iodine-based polarizing film and the dye-based polarizing film are generally produced using a polyvinyl alcohol-based film.

The polarizing film may be a known polarizing film or a polarizing film cut out from a lengthy polarizing film with the absorption axis of the polarizing film being neither parallel nor perpendicular to the longitudinal direction. The lengthy polarizing film with the absorption axis of the polarizing film being neither parallel nor perpendicular to the longitudinal direction is produced by the following method.

This polarizing film can be produced by a stretching method of stretching a continuously fed polymer film such as polyvinyl alcohol-based film to 1.1 to 20.0 times at least in the film width direction by applying a tension while holding both edges of the film with holding means, and bending the film travelling direction in the state of the film being held at both edges, where the difference in the travelling speed in the longitudinal direction between the holding devices at both edges of the film is within 3%, such that the angle made by the film travelling direction at the outlet in the step of holding both edges of the film and the substantial stretching direction of the film is inclined at 20 to 70°. Particularly, a polarizing film produced with an inclination angle of 45° is preferred in view of productivity.

The stretching method of a polymer film is described in detail in JP-A-2002-86554 (paragraphs [0020] to [0030]).

In the present invention, the slow axis of the transparent support or cellulose acetate film of the antiglare film and the transmission axis of the polarizing film are preferably arranged to run substantially in parallel.

[Protective Film]

The moisture permeability of the protective film is important for the productivity of the polarizing plate. The polarizing film and the protective film are laminated with an aqueous adhesive, and the solvent of this adhesive diffuses in the protective film and is thereby dried. As the moisture permeability of the protective film is higher, the drying rate and in turn the productivity are more elevated, but if the moisture permeability is excessively high, moisture enters into the polarizing film depending on the environment (at high humidity) where the liquid crystal display device is used, and the polarizing ability decreases.

The moisture permeability of the protective film is determined, for example, by the thickness, free volume or hydrophilicity/hydrophobicity of the transparent support or polymer film (and polymerizable liquid crystal compound). In the case of using the antiglare film of the present invention as a protective film of the polarizing plate, the moisture permeability is preferably from 100 to 1,000 $g/m^2 \cdot 24$ hrs, more preferably from 300 to 700 $g/m^2 \cdot 24$ hrs.

In the case of film production, the thickness of the transparent support can be adjusted by the lip flow rate and the line speed or by stretching and compression. The moisture permeability varies depending on the main raw material used and therefore, can be adjusted to a preferred range by controlling the thickness.

In the case of film production, the free volume of the transparent support can be adjusted by the drying temperature and time. Also in this case, the moisture permeability varies depending on the main raw material used and therefore, can be adjusted to a preferred range by controlling the free volume.

The hydrophilicity/hydrophobicity of the transparent support can be adjusted by an additive. The moisture permeability is elevated by adding a hydrophilic additive to the above-described free volume, and conversely, the moisture permeability can be lowered by adding a hydrophobic additive.

A polarizing plate having an optically compensating ability can be produced with high productivity at a low cost by independently controlling the moisture permeability.

(Optically Compensatory Film)

It is also preferred that out of two protective films of the polarizing film, the protective film other than the antiglare film of the present invention is an optically compensatory film having an optically compensatory layer comprising an optically anisotropic layer. The optically compensatory film (phase difference film) can improve the viewing angle properties on a liquid crystal display screen.

The optically compensatory film may be a known optically compensatory film, but from the standpoint of enlarging the viewing angle, the optically compensatory film described in JP-A-2001-100042 is preferred.

<Use Mode of the Present Invention>
[Image Display Device]

The antiglare film of the present invention is used for an image display device such as liquid crystal display (LCD), plasma display panel (PDP), electroluminescent display (ELD) and cathode ray tube display (CRT). The antiglare film of the present invention can be used on a known display such as plasma display panel (PDP) and cathode ray tube display (CRT).

[Liquid Crystal Display Device]

The antiglare film or polarizing plate of the present invention can be advantageously used for an image display device such as liquid crystal display and is preferably used as the outermost surface layer of the display.

In general, the liquid crystal display device comprises a liquid crystal cell and two polarizing plates disposed on both sides thereof, and the liquid crystal cell cares a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal cell is preferably in TN mode, VA mode, OCB mode, IPS mode or ECB mode.

(TN Mode)

In the TN-mode liquid crystal cell, rod-like liquid crystalline molecules are oriented substantially in the horizontal alignment at the time of not applying a voltage and furthermore, twisted at an angle of 60 to 120°.

The TN-mode liquid crystal cell is most frequently utilized as a color TFT liquid crystal display device and is described in many publications.

(VA Mode)

In the VA-mode liquid crystal cell, rod-like liquid crystalline molecules are oriented substantially in the vertical alignment at the time of not applying a voltage.

The VA-mode liquid crystal cell includes:

(1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625);

(2) an (MVA-mode) liquid crystal cell where the VA mode is modified to a multi-domain system for enlarging the viewing angle (described in *SID97 Digest of Tech. Papers* (preprints), 28, 845 (1997));

(3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

(OCB Mode)

The OCB-mode liquid crystal cell is a liquid crystal cell of bend alignment mode where rod-like liquid crystalline molecules are oriented substantially in the reverse direction (symmetrically) between upper portion and lower portion of the liquid crystal cell, and this is disclosed in U.S. Pat. Nos. 4,583,825 and 5,410,422. Since rod-like liquid crystalline molecules are symmetrically oriented between upper portion and lower portion of the liquid crystal cell, the liquid crystal cell of bend alignment mode has an optically self-compensating ability. Accordingly, this liquid crystal mode is called an OCB (optically compensatory bend) liquid crystal mode. The liquid crystal display device of bend alignment mode is advantageous in that the response speed is fast.

(IPS Mode)

The IPS-mode liquid crystal cell is a system of effecting the switching by applying a transverse electric field to the nematic liquid crystal, and this is described in detail in *Proc. IDRC (Asia Display '95)*, pp. 577-580 and ibid., pp. 707-710.

(ECB Mode)

In the ECB-mode liquid crystal cell, rod-like liquid crystalline molecules are oriented substantially in the horizontal alignment at the time of not applying a voltage. The ECB mode is one of liquid crystal display modes having a simplest structure and is described in detail, for example, in JP-A-5-203946.

[Image Display Device Other than Liquid Crystal Display Device]

(PDP)

The plasma display panel (PDP) is generally composed of a gas, a glass substrate, an electrode, an electrode lead material, a thick print material and a fluorescent material. As for the glass substrate, two sheets of front glass substrate and rear glass substrate are used. An electrode and an insulating layer are formed on the two glass substrates, and a fluorescent material layer is further formed on the rear glass substrate. The two glass substrates are assembled, and a gas is sealed therebetween.

The plasma display panel (PDP) is already available on the market. The plasma display panel is described in JP-A-5-205643 and JP-A-9-306366.

In some cases, a front panel is disposed on the front surface of the plasma display panel. The front panel preferably has sufficiently high strength for protecting the plasma display panel. The front panel may be disposed with spacing from the plasma display panel or may be laminated directly to the plasma display body. In an image display device like the plasma display panel, the antiglare film can be laminated directly to the display surface. In the case where a front panel is provided in front of the display, the antiglare film may be laminated to the front side (outer side) or back side (display side) of the front panel.

(Touch Panel)

The antiglare film of the present invention can be applied to a touch panel and the like described, for example, in JP-A-5-127822 and JP-A-2002-48913.

(Organic EL Device)

The antiglare film of the present invention can be used as a substrate (substrate film) or protective film of an organic EL device or the like.

In the case of using the antiglare film of the present invention for an organic EL device or the like, the contents described, for example, in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976 may be applied. Furthermore, the contents described in JP-A-2001-148291, JP-A-2001-221916 and JP-A-2001-231443 are preferably used in combination.

Examples

The present invention is described below by referring to Examples, but the present invention is not limited thereto.

<Antiglare Film>

[Preparation of Coating Solution for Each Layer]

[Preparation of Coating Solution for Antiglare Layer]

The components shown below are charged into a mixing tank and after stirring, the resulting solution is filtered through a polypropylene-made filter having a pore size of 30 µm to prepare the coating solution.

| {Preparation of Coating Solution (HCL-1) for Antiglare Layer} | |
|---|---|
| "DPHA" | 48.45 parts by mass |
| "MX-200" | 0.05 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-2) for Antiglare Layer} | |
|---|---|
| "DPHA" | 48.45 parts by mass |
| "SX-350H" | 0.05 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-3) for Antiglare Layer} | |
|---|---|
| "DPHA" | 48.45 parts by mass |
| "MX-500" | 0.05 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-4) for Antiglare Layer} | |
|---|---|
| "DPHA" | 48.45 parts by mass |
| "MX-1000" | 0.15 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-5) for Antiglare Layer} | |
|---|---|
| "DPHA" | 48.45 parts by mass |
| "MX-1500" | 0.15 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-6) for Antiglare Layer} | |
|---|---|
| "DPHA" | 48.45 parts by mass |
| "MX-2000" | 0.05 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-7) for Antiglare Layer} | |
|---|---|
| "DPHA" | 48.4975 parts by mass |
| "MX-1000" | 0.0025 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-8) for Antiglare Layer} | |
|---|---|
| "DPHA" | 48.475 parts by mass |
| "SX-500H" | 0.025 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-9) for Antiglare Layer} | |
|---|---|
| "DPHA" | 47.5 parts by mass |
| "MX-1000" | 1.0 parts by mass |
| "Irgacure 184" | 1.5 parts by mass |
| Methyl isobutyl ketone | 30.0 parts by mass |
| Methyl ethyl ketone | 20.0 parts by mass |

| {Preparation of Coating Solution (HCL-10) for Antiglare Layer} | |
|---|---|
| "DPHA" | 47.5 parts by mass |
| "MX-1000" | 2.0 parts by mass |
| "Irgacure 184" | 1.5 parts by mass |
| Methyl isobutyl ketone | 30.0 parts by mass |
| Methyl ethyl kerone | 20.0 parts by mass |

(Preparation of Sol Solution a-2)

In a 1,000 ml-volume reaction vessel equipped with a thermometer, a nitrogen inlet tube and a dropping funnel, 187 g (0.80 mol) of acryloxyoxypropyltrimethoxysilane, 27.2 g (0.20 mol) of methyltrimethoxysilane, 320 g (10 mol) of methanol and 0.06 g (0.001 mol) of KF are charged, and 15.1 g (0.86 mol) of water is slowly added dropwise at room temperature with stirring. After the completion of dropwise addition, the resulting solution is stirred at room temperature for 3 hours and then stirred under heating for 2 hours while refluxing methanol. Subsequently, the low boiling portion is removed by distillation under reduced pressure, and the residue is filtered to obtain 120 g of Sol Solution a-2. The thus-obtained substance is measured by GPC, as a result, the mass average molecular weight is 1,500 and out of the oligomer or higher components, the proportion of the components having a molecular weight of 1,000 to 20,000 is 30%.

Also, from the measurement results of $^1$H-NMR, the obtained substance is found to have a structure represented by the following formula.

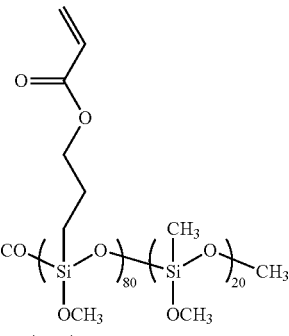

80:20 is the molar ratio

Furthermore, the shrinkage ratio a by the $^{29}$Si-NMR measurement is 0.56. This analysis result reveals that the majority of this silane coupling agent sol is occupied by a linear chain structure moiety.

Also, from the gas chromatography, the residual ratio of the raw material acryloxypropyltrimethoxysilane is found to be 5% or less.

| {Preparation of Coating Solution (HCL-11) for Antiglare Layer} | |
|---|---|
| PET-30 | 50.0 g |
| Irgacure 184 | 2.0 g |
| Crosslinked acryl-styrene particle (30%) | 14.5 g |
| Sol Solution a-2 | 9.5 g |
| Toluene | 38.5 g |

The components above are as follows.

"DPHA":

A mixture of dipentaerythritol pentaacrylate and dipentaerythritol hexaacrylate, refractive index: 1.52, produced by Nippon Kayaku Co., Ltd.

"PET-30":
  A mixture of pentaerythritol triacrylate and pentaerythritol tetraacrylate [produced by Nippon Kayaku Co., Ltd.]
"Irgacure 184":
  Photopolymerization initiator, produced by Ciba Specialty Chemicals Corp.
"MX-200":
  Polymethyl methacrylate fine particle, average particle diameter: 2.0 μm, produced by The Soken Chemical & Engineering Co.
"MX-500":
  Polymethyl methacrylate fine particle, average particle diameter: 5.0 μm, produced by The Soken Chemical & Engineering Co.
"MX-1000":
  Polymethyl methacrylate fine particle, average particle diameter: 10.0 μm, produced by The Soken Chemical & Engineering Co.
"M-1500":
  Polymethyl methacrylate fine particle, average particle diameter 15 μm, produced by The Soken Chemical & Engineering Co.
"MX-2000":
  Polymethyl methacrylate fine particle, average particle diameter: 20 μm, produced by The Soken Chemical & Engineering Co.
"SX-350H":
  Polystyrene fine particle, average particle diameter: 3.5 μm, produced by The Soken Chemical & Engineering Co.
"Crosslinked Acryl-Styrene Particle":
  Average particle diameter: 3.5 μm, refractive index: 1.53.
"SX-500H":
  Polystyrene fine particle, average particle diameter: 5.0 μm, produced by The Soken Chemical & Engineering Co.

[Preparation of Coating Solution for Low Refractive Index Layer]

(Preparation of Sol Solution a)

In a reaction vessel equipped with a stirrer and a reflux condenser, 120 parts by mass of methyl ethyl ketone, 100 pats by mass of acryloxypropyltrimethoxysilane "KBM-5103" {produced by Shin-Etsu Chemical Co., Ltd.} and 3 parts by mass of diisopropoxyaluminum ethyl acetate are added and mixed and after adding 30 parts by mass of ion-exchanged water, the reaction is allowed to proceed at 60° C. for 4 hours. The reaction solution is then cooled to room temperature to obtain Sol Solution a. The mass average molecular weight is found to be 1,800 and out of the oligomer or higher components, the proportion of the components having a molecular weight of 1,000 to 20,000 is found to be 100 mass %. Also, from the gas chromatography analysis, it is revealed that the raw material acryloxypropyltrimethoxysilane does not remain at all.

{Preparation of Hollow Silica Fine Particle Liquid Dispersion (A-I)}

30 Parts by mass of acryloyloxypropyltrimethoxysilane "KBM-5103" {produced by Shin-Etsu Chemical Co., Ltd.} and 1.5 parts by mass of diisopropoxyaluminum ethyl acetate "Kerope EP-12" {produced by Hope Chemical Co., Ltd.} are added to 500 pats by mass of a hollow silica fine particle sol (particle diameter: approximately from 40 to 50 nm, thickness of shell: from 6 to 8 nm, refractive index: 1.31, concentration of solid contents: 20 mass %, main solvent: isopropyl alcohol, prepared according to Preparation Example 4 of JP-A-2002-79616 by changing the particle size) and mixed, and 9 parts by mass of ion-exchanged water is added thereto. After allowing Me reaction to proceed at 60° C. for 8 hours, the reaction solution is cooled to room temperature, and 1.8 parts by mass of acetyl acetone is added to obtain Hollow Silica Liquid Dispersion (A-1). The concentration of solid contents in the obtained hollow silica liquid dispersion is found to be 18 mass % and the refractive index after drying the solvent is found to be 1.31.

{Preparation of Coating Solution (LL-1) for Low Refractive Index Layer}

44.0 Parts by mass of Fluorine-Containing Copolymer (P-3) (weight average molecular weight: about 50,000) described in JP-A-2004-45462), 6.0 parts by mass of a mixture of dipentaerythritol pentaacrylate and dipentaerythritol hexaacrylate "DPHA" {produced by Nippon Kayaku Co., Ltd.}, 3.0 parts by mass of terminal methacrylate group-containing silicone "RMS-033" {produced by Gelest), and 3.0 parts by mass of "Irgacure 907" (produced by Ciba Specialty Chemicals Corp.} are added to 100 parts by mass of methyl ethyl ketone and dissolved. Thereafter, 195 parts by mass of Hollow Silica Fine Particle Liquid Dispersion (A-1) (39.0 parts by mass as the solid content of silica+surface treating agent) and 17.2 parts by mass (5.0 parts by mass as the solid content) of Sol Solution a are added. The resulting solution is diluted with cyclohexane and methyl ethyl ketone such that the concentration of solid contents in the entire coating solution becomes 6 mass % and the ratio between cyclohexane and methyl ethyl ketone becomes 10:90, to prepare Coating Solution (LL-1) for Low Refractive Index Layer.

[Production of Antiglare Film]

[Coating of Antiglare Layer]

Using the slot die coater shown in FIG. 1 of JP-A-2003-211052, a 80 μm-thick triacetyl cellulose film "TAC-TD80U" {produced by Fujifilm Corp.} in a roll form is unrolled, and Coating Solutions (HCL-I) to (HCL-10) for Antiglare Layer each is coated thereon to have a dry thickness shown in Table 3, and dried at 30° C. for 15 seconds and further at 90° C. for 20 seconds. Thereafter, the coating layer is cured by irradiating an ultraviolet ray at an irradiation dose of 130 mJ/cm$^2$ with use of "Air-Cooled Metal Halide Lamp" {manufactured by Eye Graphics Co., Ltd.} of 160 W/cm under nitrogen purging to produce Antiglare Films (HC-1) to (HC-17), and each film is then taken up.

[Coating of Low Refractive Index Layer]

In the case of Samples (HC-13) and (HC-17), Coating Solution (LL-1) for Low Refractive Index Layer is further wet-coated on the antiglare layer by using a slot die coater shown in FIG. 1 of JP-A-2003-211052 to give a low refractive index layer having a dry thickness of 90 nm, dried at 60° C. for 50 seconds and farther irradiated with an ultraviolet ray at an irradiation dose of 40 mJ/cm$^2$ by using "Air-Cooled Metal Halide Lamp" {manufactured by Eye Graphics Co., Ltd.} of 240 W/cm in an atmosphere having an oxygen concentration of 100 ppm under nitrogen purging to form a low refractive index layer, and the resulting film is taken up. In this way, Antiglare Films (HC-13) and (HC-17) are produced.

[Evaluation of Antiglare Film]

[Surface Roughness Skewness (Rsk)]

As regards the surface roughness skewness (Rsk), the value derived by a surface roughness meter "SURFCORDER SE3500", {manufactured by Kosaka Laboratory Ltd.} from the surface roughness (Ra) measured using the surface roughness meter by setting the measurement conditions according to "Table" described above in "Antiglare Layer", is employed.

[Average Particle Diameter]

The produced antiglare film is transmitted and photographed at 5,000 times by an electron microscope "S-3400N" {manufactured by Hitachi High-Technologies Corp.}. From the particles photographed, 10 particles are randomly selected and the average value of the diameters of 10 particles is taken as the average particle diameter.

[Average Particle Diameter]

The cross-section of the produced antiglare film is photographed at 5,000 times by an electron microscope "S-3400N" {manufactured by Hitachi High-Technologies Corp.}. The thickness of the antiglare layer is measured randomly at 10 points and the average value is derived. This operation is performed for three viewing fields, and the average value thereof is taken as the average thickness.

[Projection]

After blacking out the back surface of the antiglare film by a black marker, light of a fluorescent lamp is reflected on the front surface of the antiglare film and the projection of light is evaluated.

A: Reflection of light is not bothersome.

B: Light is reflected but satisfactorily diffused and is not bothersome.

C: The figure of the fluorescent lamp is projected but is not bothersome.

D: The figure of the fluorescent lamp is clearly projected and is glaring and bothersome.

The level of C or higher is judged as "pass".

(Reflectance)

The back surface of the antireflection film is roughened with sandpaper and then treated with black ink to provide a state of the reflection on the back surface being eliminated. The front surface of the antireflection film is loaded to an integrating sphere of a spectrophotometer V-550 (manufactured by JASCO Corporation), and the reflectance (integrated reflectance) is measured in the wavelength region of 380 to 780 nm. The average reflectance at 450 to 650 nm is calculated, and the antireflection property is evaluated by the value obtained.

The layer construction and various properties measured of each of the antiglare films obtained above are shown in Table 3.

<Polarizing Plate>

[Production of Polarizing Plate]

A polarizing film is produced by adsorbing iodine to a stretched polyvinyl alcohol film. Antiglare Films (HC1) to (HC-17) each is saponified and laminated to one side of the polarizing film by using a polyvinyl alcohol-based adhesive, such that the cellulose triacetate side of each antiglare film comes to the polarizing film side. Also, a commercially available cellulose triacetate film "FUJITAC TD80UF" {produced by Fujifilm Corp.} is laminated to the polarizing film surface opposite the side where the antiglare film is laminated, by using a polyvinyl alcohol-based adhesive. In this way, Polarizing Plates (HKH-01) to (HKH-17) with antiglare film are produced.

[Evaluation of Polarizing Plate]

[Glaring]

The polarizing plate on the viewing side of a 32-type full-spec high vision liquid crystal TV "LC-32GS10" {manufactured by Sharp Corp., pixel size: 370 μm} is removed, and Polarizing Plates (HKH-01) to (HKH-17) each is laminated instead to the viewing side through an adhesive such that the antiglare film comes to the outmost surface.

The glaring of the screen when the liquid crystal TV is lighted and displayed in white is evaluated.

A: Glaring is not bothersome.

B: Glaring is slightly generate but causes no problem in practice.

C: Glaring is strongly generated and bothersome.

The level of B or higher is judged as "pass".

(White-Brownish Appearance)

The polarizing plate on the viewing side of a 32-inch full Hi-Vision liquid crystal TV "LC-32GS10" {manufactured by Sharp Corp.} is stripped off, and Polarizing Plates (HKH-01) to (HKH-17) each is laminated instead to the viewing side though an adhesive such that the antiglare film comes to the outmost surface. The panel is driven in black display mode under the general home environment using TV (about 200 Lx). The white-brownish appearance is judged with an eye and rated A when the degree of blackness is very good, rated B when the degree of blackness is good, rated C when the appearance is slightly white-brownish but causes no problem in practice, and rated D when a white-brownish appearance is generated. The level of C or higher is judged as "pass".

TABLE 3

| | Antiglare Film | Coating Solution for Antiglare Layer | Coating Solution for Low Refractive Index Layer | Amount of Particle Added (mass %) | Average Particle Diameter (μm) | Average Film Thickness (μm) | Rsk | Reflectance | Projection | Glaring | White-Brownish Appearance |
|---|---|---|---|---|---|---|---|---|---|---|---|
| Comparative Example | HC-1 | HCL-1 | — | 0.1 | 2 | 1.5 | 1 | 4.5% | D | A | C |
| Invention | HC-2 | HCL-2 | — | 0.1 | 3.5 | 3 | 1 | 4.5% | B | A | C |
| Invention | HC-3 | HCL-3 | — | 0.1 | 5 | 4.5 | 1 | 4.5% | B | A | C |
| Invention | HC-4 | HCL-4 | — | 0.3 | 10 | 8.5 | 1 | 4.5% | B | A | C |
| Invention | HC-5 | HCL-5 | — | 0.3 | 15 | 13 | 1 | 4.5% | B | A | C |
| Comparative Example | HC-6 | HCL-6 | — | 0.1 | 20 | 18 | 1 | 4.5% | B | C | C |
| Comparative Example | HC-7 | HCL-7 | — | 0.005 | 10 | 9 | 1.7 | 4.5% | D | A | C |
| Invention | HC-8 | HCL-8 | — | 0.05 | 5 | 4.5 | 1.3 | 4.5% | C | A | C |
| Invention | HC-9 | HCL-9 | — | 2 | 10 | 9.3 | 0.7 | 4.5% | B | B | C |
| Comparative Example | HC-10 | HCL-10 | — | 4 | 10 | 9.5 | 0.3 | 4.5% | B | C | C |
| Comparative Example | HC-11 | HCL-4 | — | 0.3 | 10 | 6 | 0.3 | 4.5% | B | C | D |
| Comparative Example | HC-12 | HCL-4 | — | 0.3 | 10 | 10.5 | −0.1 | 4.5% | D | A | C |
| Invention | HC-13 | HCL-4 | LL-1 | 0.3 | 10 | 7.5 | 1 | 1.5% | A | A | A |
| Comparative Example | HC-14 | HCL-11 | LL-1 | 6.6 | 3.5 | 6 | 0.2 | 2.0% | B | C | B |

As seen from Table 3, when the surface roughness skewness (Rsk) is from 0.5 to 1.5 or when the average particle diameter of the fine particle contained in the antiglare layer is from 3 to 15 μm, the average thickness of the antiglare layer is smaller by 0.01 to 3.0 μm than the average particle diameter of the fine particle, and the amount of the particle added is from 0.01 to 3 mass % based on the entire solid content, an antiglare film enabling to reduce the projection and glaring is obtained. In addition, it is seen that when a low refractive index layer is stacked on the antiglare film of the present invention, the reduction in the reflectance is larger than that brought about by stacking the low refractive index layer on a conventional antiglare film, and an antiglare film assured of good denseness of black is obtained.

The antiglare film of the present invention causes less glaring appearance of an image and has sufficiently high antiglare property. Also, by virtue of using the antiglare film of the present invention, even in the case of a flat panel display having a highly fine pixel, an image display device assured of less generation of glaring on screen can be provided. Furthermore, when the average diameter of the convex part in the antiglare layer of the antiglare film of the present invention is 10% or less of the pixel size of the image display device, an image display device more reduced in glaring is obtained.

The entire disclosure of each and every foreign patent application from which the benefit of foreign priority has been claimed in the present application is incorporated herein by reference, as if fully set forth.

What is claimed is:

1. An antiglare film comprising:
   a transparent support; and
   an antiglare layer containing a binder and a fine particle, wherein:
   the antiglare layer has an average thickness smaller than an average particle diameter of the fine particle,
   the antiglare layer has a surface roughness skewness (Rsk) of from 0.5 to 1.5,
   the average particle diameter of the fine particle is from 3 to 15 μm,
   the average thickness of the antiglare layer is smaller by 0.01 to 3.0 μm than the average particle diameter of the line particle, and
   the line particle is contained in the antiglare layer in a proportion of from 0.05 to 2 mass % based on all solid contents constituting the antiglare layer.

2. The antiglare film of claim 1, further comprising:
   a low refractive index layer on the antiglare layer, which has a refractive index lower than a refractive index of the antiglare layer.

3. The antiglare film of claim 2, wherein
   the low refractive index layer contains a hollow fine particle having an average particle diameter in a size corresponding to from 30 to 100% of a thickness of the low refractive index layer and having a refractive index of from 1.17 to 1.40.

4. A polarizing plate comprising:
   a polarizing film; and
   a pair of protective films between which the polarizing film is sandwiched,
   wherein
   either one of the pair of protective films is the antiglare film of claim 1.

5. An image display device comprising:
   the antiglare film of claim 1 on a viewing-side outermost surface thereof.

6. An image display device comprising:
   the polarizing plate of claim 4 on a viewing-side outermost surface thereof.

* * * * *